US012250944B2

(12) United States Patent
Chapellier et al.

(10) Patent No.: US 12,250,944 B2
(45) Date of Patent: Mar. 18, 2025

(54) HIGH-FIDELITY LONG-TERM STORAGE OF BIOLOGICAL MATERIAL

(71) Applicants: Centre National de la Recherche Scientifique (CNRS), Paris (FR); Institut Pasteur, Paris (FR); Université Paris Cité, Paris (FR); Groupe Hospitalier Universitaire Paris—Psychiatrie et Neurosciences, Paris (FR)

(72) Inventors: Maurice Chapellier, Gif-sur-Yvette (FR); Fabrice Chretien, Paris (FR); Fabrice Piquemal, Le Barp (FR); Pierre Rocheteau, Paris (FR); Guillaume Warot, Modane (FR); Michel Zampaolo, Saint Ismier (FR)

(73) Assignees: Centre National de la Recherche Scientifique (CNRS), Paris (FR); Institut Pasteur, Paris (FR); Université Paris Cité, Paris (FR); Groupe Hospitalier Universitaire Paris—Psychiatrie et Neurosciences, Paris (FR)

( * ) Notice: Subject to any disclaimer, the term of this patent is extended or adjusted under 35 U.S.C. 154(b) by 0 days.

(21) Appl. No.: 16/757,013

(22) PCT Filed: Oct. 18, 2018

(86) PCT No.: PCT/EP2018/078569
§ 371 (c)(1),
(2) Date: Apr. 17, 2020

(87) PCT Pub. No.: WO2019/077048
PCT Pub. Date: Apr. 25, 2019

(65) Prior Publication Data
US 2020/0337299 A1 Oct. 29, 2020

(30) Foreign Application Priority Data

Oct. 18, 2017 (EP) .................................. 17306409

(51) Int. Cl.
*A01N 1/02* (2006.01)
*G21F 5/10* (2006.01)

(52) U.S. Cl.
CPC ......... *A01N 1/0257* (2013.01); *A01N 1/0268* (2013.01); *A01N 1/0278* (2013.01); *G21F 5/10* (2013.01)

(58) Field of Classification Search
CPC .. A01N 1/0257; A01N 1/0268; A01N 1/0278; G21F 5/10
(Continued)

(56) References Cited

U.S. PATENT DOCUMENTS 681,400 A * 8/1901 McCarty ................ G09B 23/36
434/297
8,883,719 B2 11/2014 Birge et al.
(Continued)

FOREIGN PATENT DOCUMENTS

KR 20100106261 A * 10/2010
WO 2004/033729 A1 4/2004

OTHER PUBLICATIONS

Theodorsson, Pall, Measurement of Weak Radioactivity, 1996, pp. 155 (Year: 1996).*
(Continued)

*Primary Examiner* — Michael L Hobbs
*Assistant Examiner* — Lenora A Abel
(74) *Attorney, Agent, or Firm* — Banner & Witcoff, Ltd.

(57) ABSTRACT

The present invention relates to the long-term preservation of biological material. More specifically, it concerns a preservation container comprising:
(Continued)

a biological container for containing biological material,
a first shield configured for absorbing gamma-rays,
a second shield configured for absorbing ambient neutrons, said second shield surrounding the biological container,
the preservation container being of low-radioactivity background materials,
and a method for preserving a biological material, comprising:
a) providing a biological material in a confinement container,
b) providing the preservation container of the invention,
c) placing the confinement container containing the biological material into said preservation container,
d) storing said preservation container containing the biological material in a room located under a material attenuating cosmic rays and induced particles, said material having a thickness equivalent to 1 m to 7000 m of water, for attenuating cosmic rays.

19 Claims, 27 Drawing Sheets

(58) Field of Classification Search
USPC .................................................. 435/307.1
See application file for complete search history.

(56) References Cited

U.S. PATENT DOCUMENTS

| | | | | |
|---|---|---|---|---|
| 10,648,964 | B2* | 5/2020 | Rice ..................... | B65D 43/02 |
| 2008/0269549 | A1* | 10/2008 | Taft ..................... | A01N 1/0268 |
| | | | | 600/35 |
| 2015/0048085 | A1* | 2/2015 | Brown ............... | B65D 83/0055 |
| | | | | 220/228 |
| 2016/0341711 | A1 | 11/2016 | Rice et al. | |

OTHER PUBLICATIONS

KR20100106261A—Choi Machine English Translation Description (Year: 2010).*
Nuclear Regulatory Commission) NRC.gov—PowerPoint Presentation: Basic Health Physics, Shielding Radiation (2011). (Year: 2011).*
Theodorsson, Pall, Measurement of Weak Radioactivity, 1996, pp. 156 (Year: 1996).*
Kreuzer, et al., (Year: 2010).*
Plummer et al. (Year: 1998).*
Pacific News Center, "U.S. EPA: Radiation Sensors Confirm "No Radiation Levels of Concern" Anywhere in U.S." p. 1 (Year: 2011).*
Pacific News Center, "U.S. EPA: Radiation Sensors Confirm "No Radiation Levels of Concern" Anywhere in U.S." p. 2 (Year: 2011).*
Measure of Weak Radioactivity—Theodorsson (Year: 1996).*
(Nuclear Regulatory Commission) NRC.gov—PowerPoint Presentation: Basic Health Physics, Shielding Radiation (Year: 2011).*
Pacific News Center (Year: 2011).*
Plummer (Year: 1998).*
KR20100106261A—Choi Machine Translation (Year: 2010).*
Sambasivan et al. Distinct Regulatory Cascades Govern Extraocular and Pharyngeal Arch Muscle Progenitor Cell Fates. Dev. Cell 16, 810-821 (2009).
Rocheteau et al. A subpopulation of adult skeletal muscle stem cells retains all template DNA strands after cell division. Cell 148, 112-125 (2012).
Hoeijmakers, J. H. Genome maintenance mechanisms for preventing cancer. Nature 411, 366-74 (2001).
Rothkamm et al. Evidence for a lack of DNA double-strand break repair in human cells exposed to very low x-ray doses. Proc. Natl. Acad. Sci. U. S. A. 100, 5057-62 (2003).
Mohrin et al. Hematopoietic stem cell quiescence promotes error-prone DNA repair and mutagenesis. Cell Stem Cell 7, 174-185 (2010).
Ferdousi et al. More efficient repair of DNA double-strand breaks in skeletal muscle stem cells compared to their committed progeny. Stem Cell Res. 13, 492-507 (2014).
Sotiropoulou et al. Bcl-2 and accelerated DNA repair mediates resistance of hair follicle bulge stem cells to DNA-damage-induced cell death. Nat. Cell Biol. 12, 572-582 (2010).
Weinstock et al. Modeling oncogenic translocations: Distinct roles for double-strand break repair pathways in translocation formation in mammalian cells. DNA Repair (Amst). 5, 1065-1074 (2006).
Wyman et al. DNA double-strand break repair: all's well that ends well. Annu. Rev. Genet. 40, 363-83 (2006).
Cory et al. The Bcl-2 family: roles in cell survival and oncogenesis. Oncogene 22, 8590-607 (2003).
Jang et al. A low level of reactive oxygen species selects for primitive hematopoietic stem cells that may reside in the low-oxygenic niche. Blood 110, 3056-3063 (2007).
Owusu-Ansah et al. Reactive oxygen species prime *Drosophila* haematopoietic progenitors for differentiation. Nature 461, 537-41 (2009).
Dansen et al. Redox-sensitive cysteines bridge p300/CBP-mediated acetylation and FoxO4 activity. Nat. Chem. Biol. 5, 664-72 (2009).
Seale et al. Pax7 is required for the specification of myogenic satellite cells. Cell 102, 777-786 (2000).
Zammit et al.The skeletal muscle satellite cell: the stem cell that came in from the cold. J. Histochem. Cytochem. Off. J. Histochem. Soc. 54, 1177-1191 (2006).
Deprimo et al. Human placental alkaline phosphatase as a histochemical marker of gene expression in transgenic mice. Transgenic Res. 5, 459-66 (1996).
Kelly et al. Myosin light chain 3F regulatory sequences confer regionalized cardiac and skeletal muscle expression in transgenic mice. J. Cell Biol. 129, 383-396 (1995).
Beauchamp et al. Dynamics of myoblast transplantation reveal a discrete minority of precursors with stem cell-like properties as the myogenic source. J. Cell Biol. 144, 1113-1121 (1999).
Ziegler, J.F. Terrestrial cosmic rays IBM J. Res. Develop. 40 No. Jan. 1, 1996.
Mei et al. Muon-induced background study for underground laboratories. Phys. Rev. D 73, 053004 (2006).
Gordon et al. Measurement of the Flux and Energy Spectrum of Cosmic-Ray Induced Neutrons on the Ground IEEE Transactions on Nuclear Science, vol. 51, No. 6, Dec. 2004.
Elmahroug et al. "Calculation of Fast Neutron Removal Cross-Sections for Different Shielding Materials" International Journal of Physics and Research (IJPR) ISSN 2250-0030 vol. 3, Issue 2, Jun. 2013, 7-16.
Cox, Jonathan PL. Long-term data storage in DNA. Trends in Biotechnology 19, 7 (2001), 247-250.
Yachie et al. Alignment-based approach for durable data storage into living organisms. Biotechnology progress 23, 2 (2007), 501-505.
Woods et al. "Off the shelf cellular therapeutics: factors to consider during cryopreservation and storage of human ceels for clinical use". Cytotherapy, 18(6), 2016, 697-711.
Cugia et al. "High Survival of Frozen Cells Irradiated with Gamma Radiation". Radiation Protection Dosimetry, 143 (2-4), 2010, 237-240.
Bottigli et al. "Effect of cryo-preservation on the response of different biological systems to g-ray exposure: A feasibility study". Nuovo Cimento, 31(1), 2008, 11-20.
Desrosiers et al. "Membranous and structural damage that occur during cryopreservation of human sperm may be time-related events". Fertility and sterility, 85(6), 2006, 1744-1752.
Tellili et al. "Calculation of fast neutron removal cross sections for different lunar soils". Advances in Space Search 53 (2014) 348-352.

(56) References Cited

OTHER PUBLICATIONS

Limbachiya et al. "Natural Data Storage: A Review on sending Information from now to then via Nature" ACM Journal on Emerging Technologies in Computing Systems, May 19, 2015, pp. A:1-A:17.

* cited by examiner

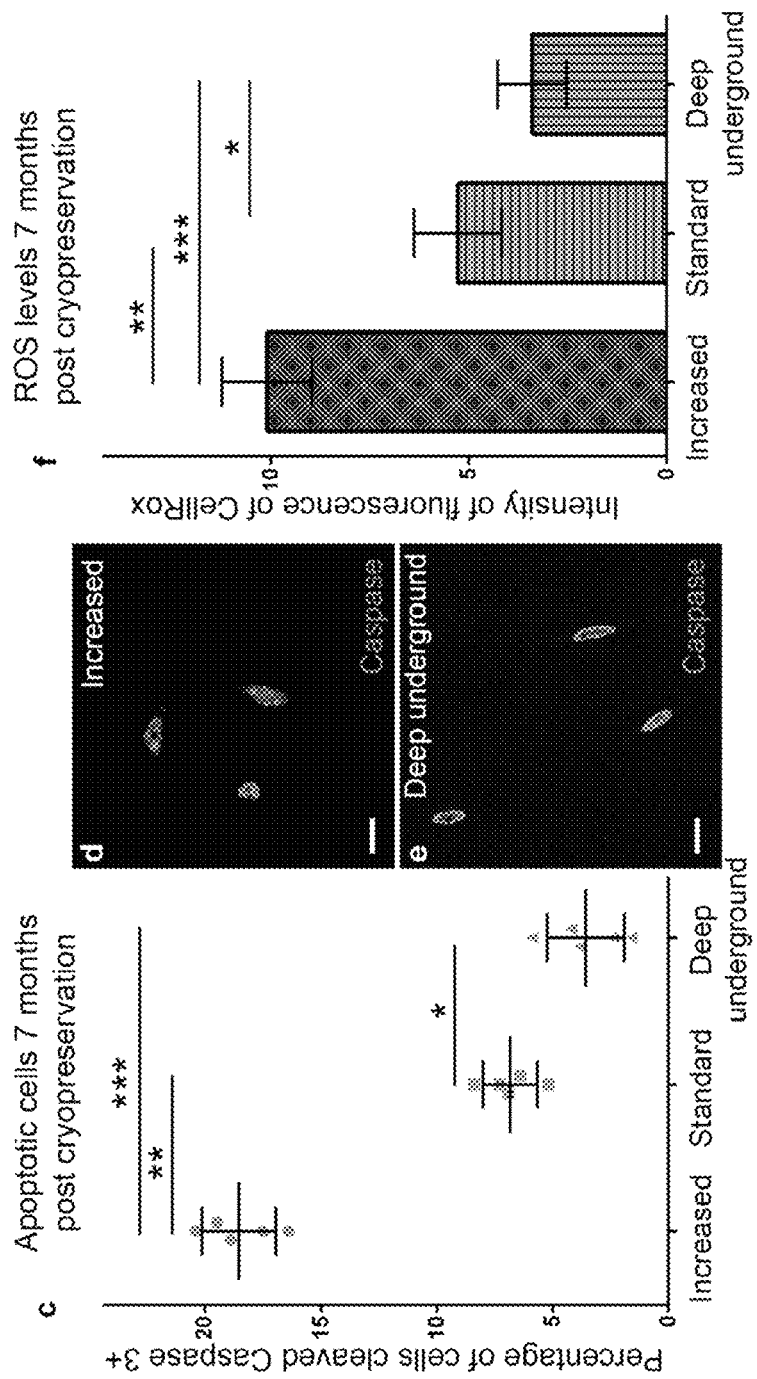
Figure 2 (Continue)

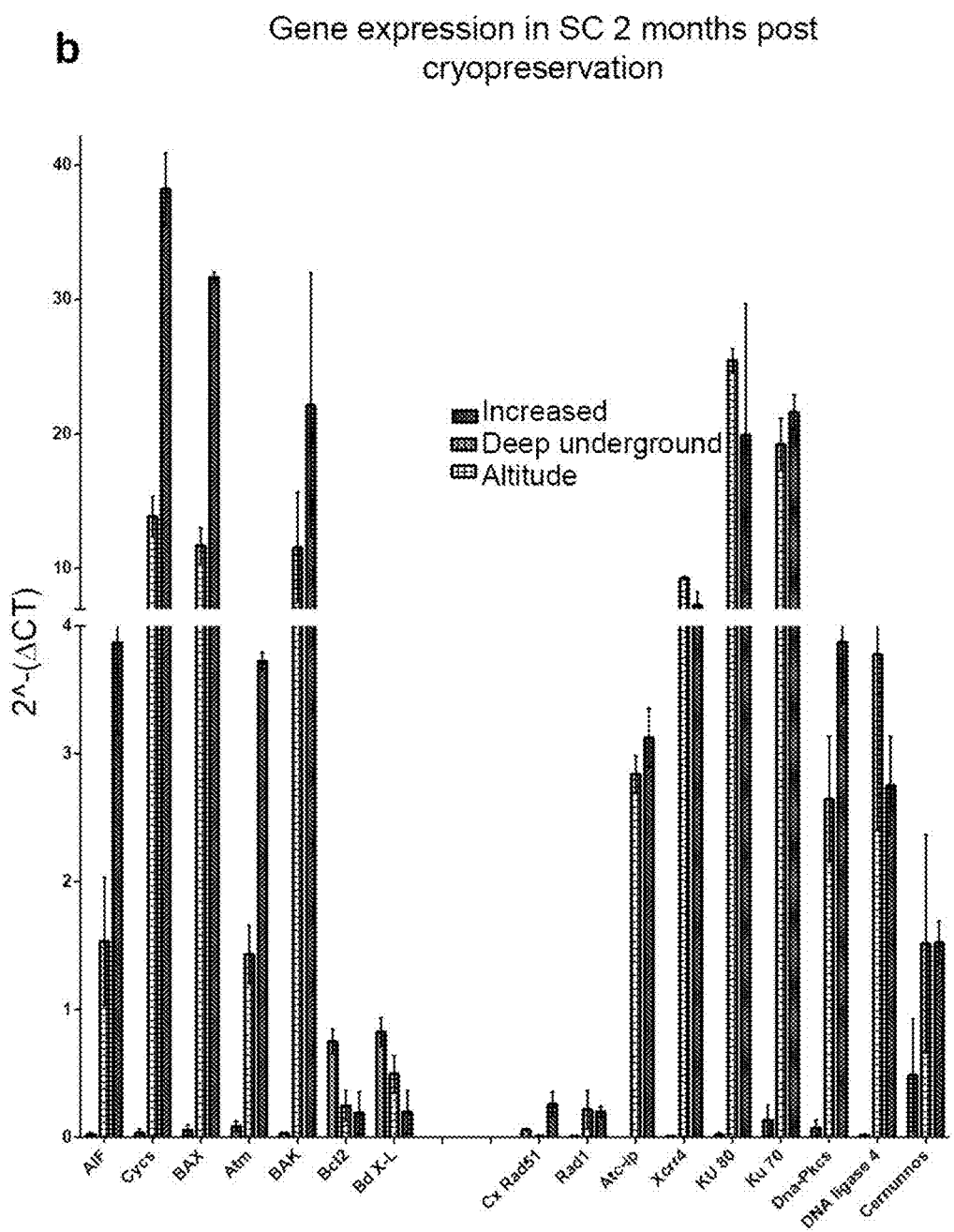
Figure 3 (Continue)

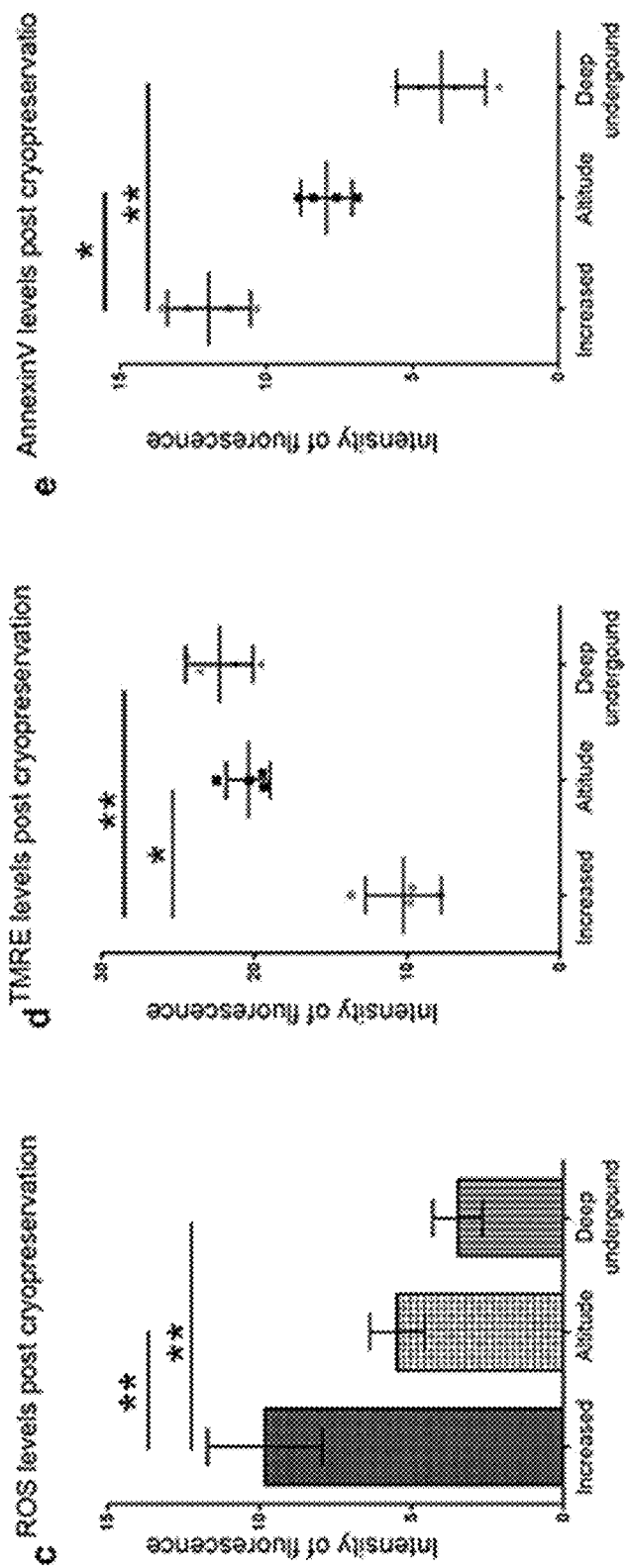
Figure 3 (Continue)

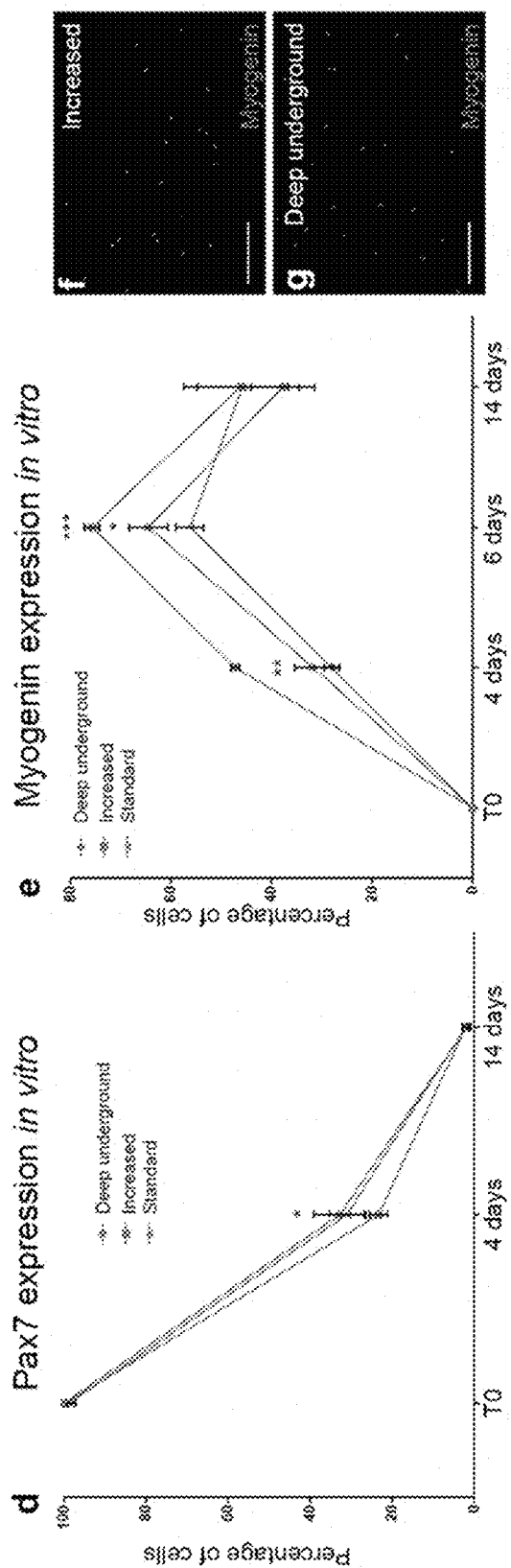
Figure 4 (Continue)

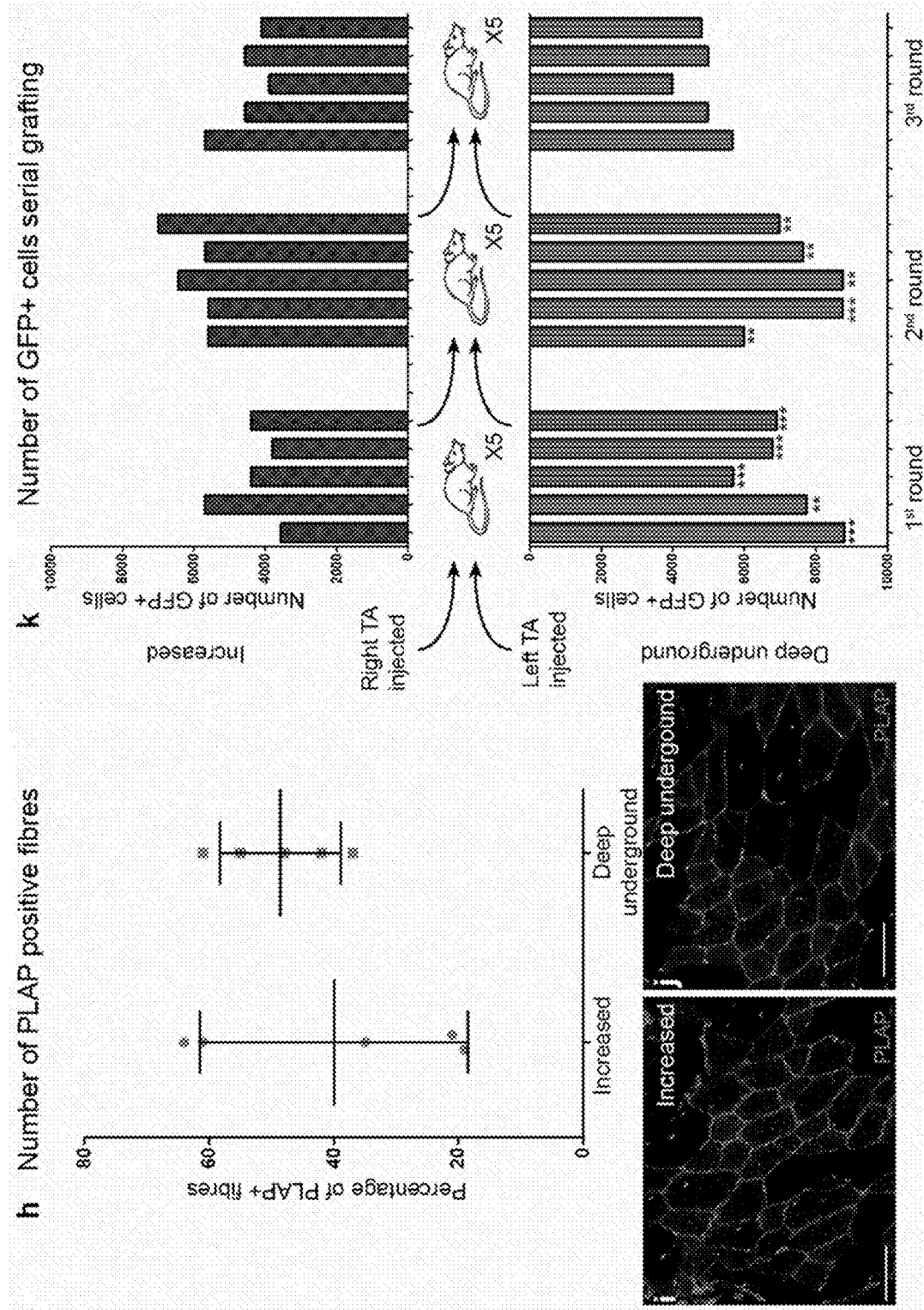
Figure 4 (Continue)

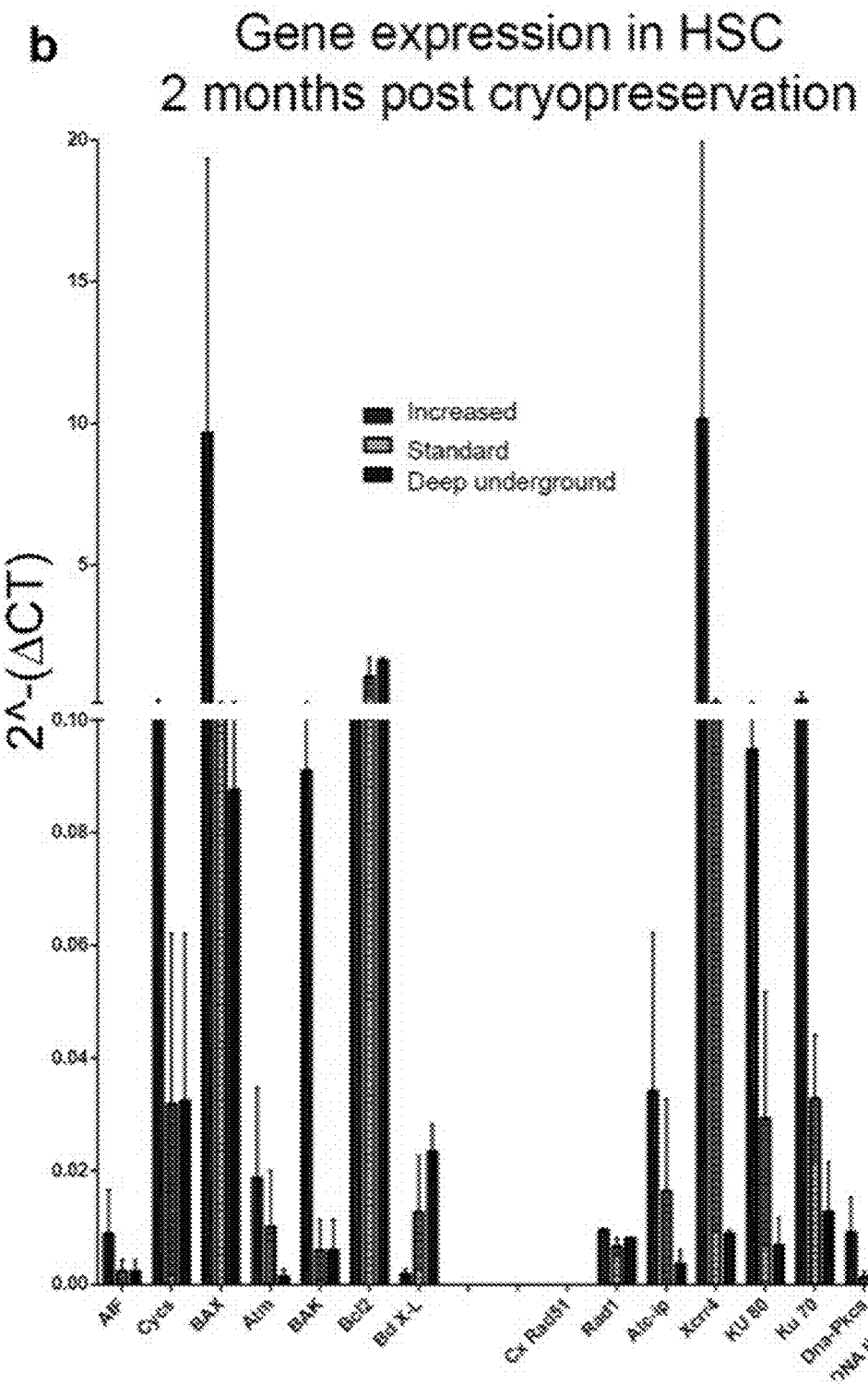
Figure 6 (Continue)

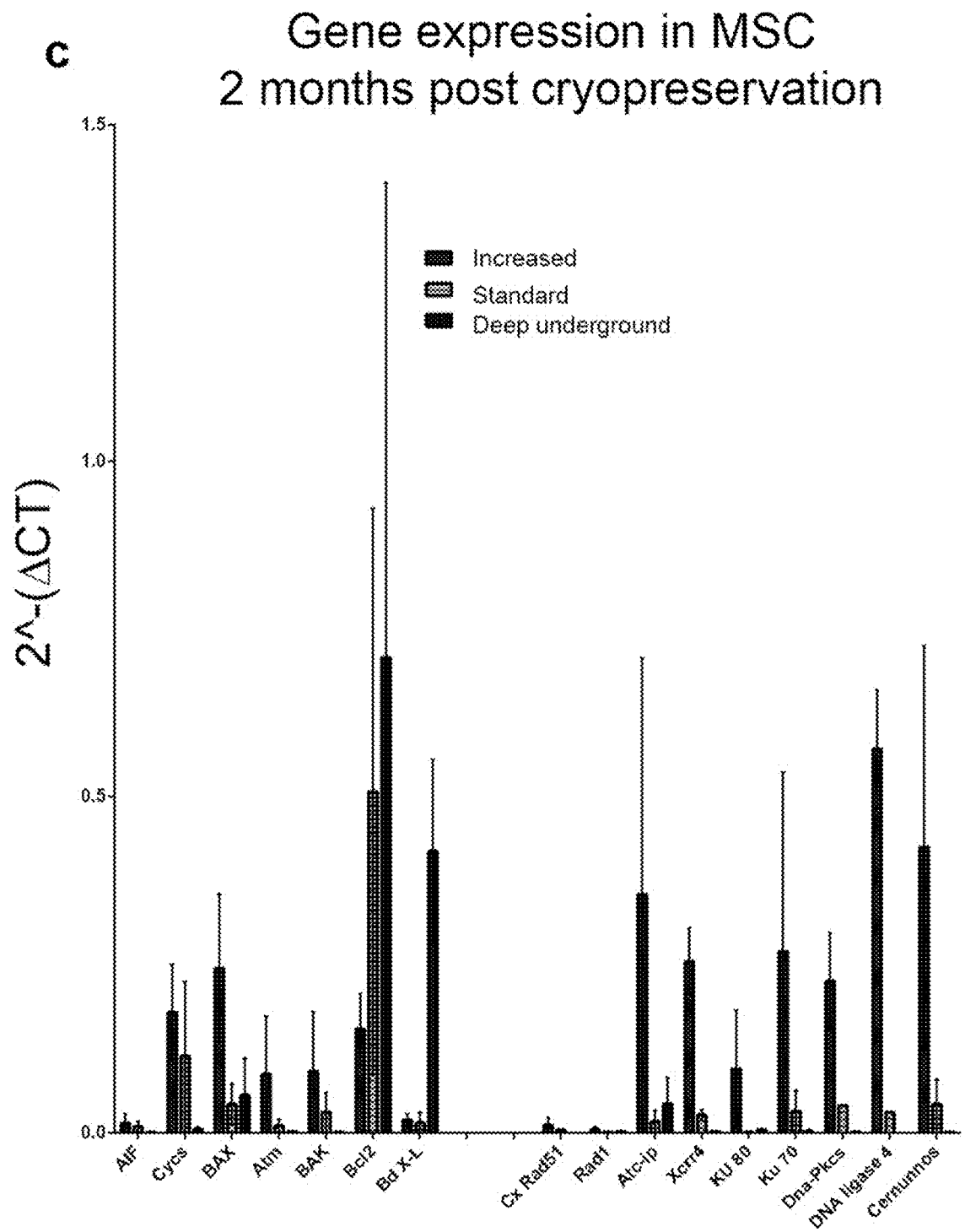
Figure 6 (Continue)

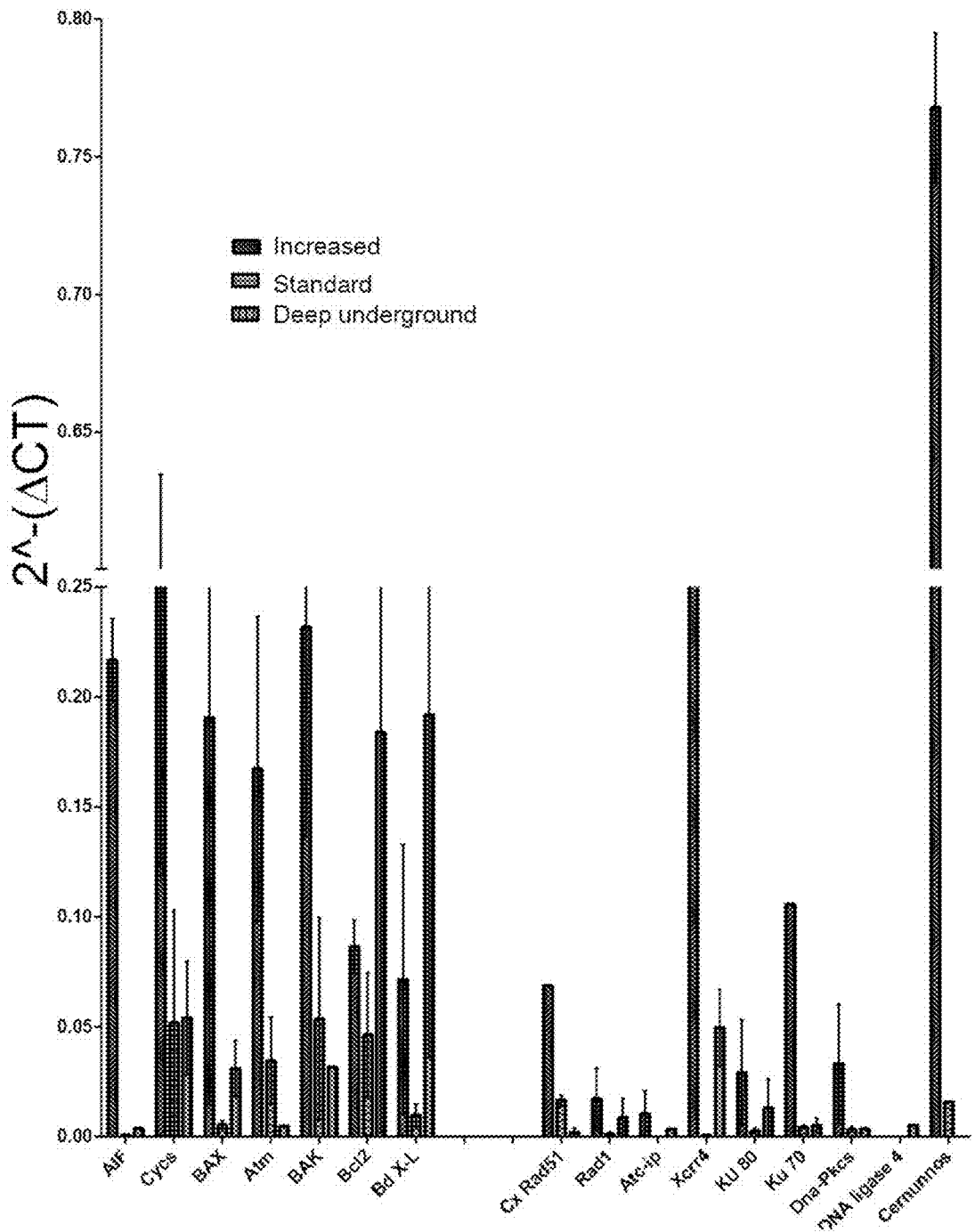
Figure 7 (Continue)

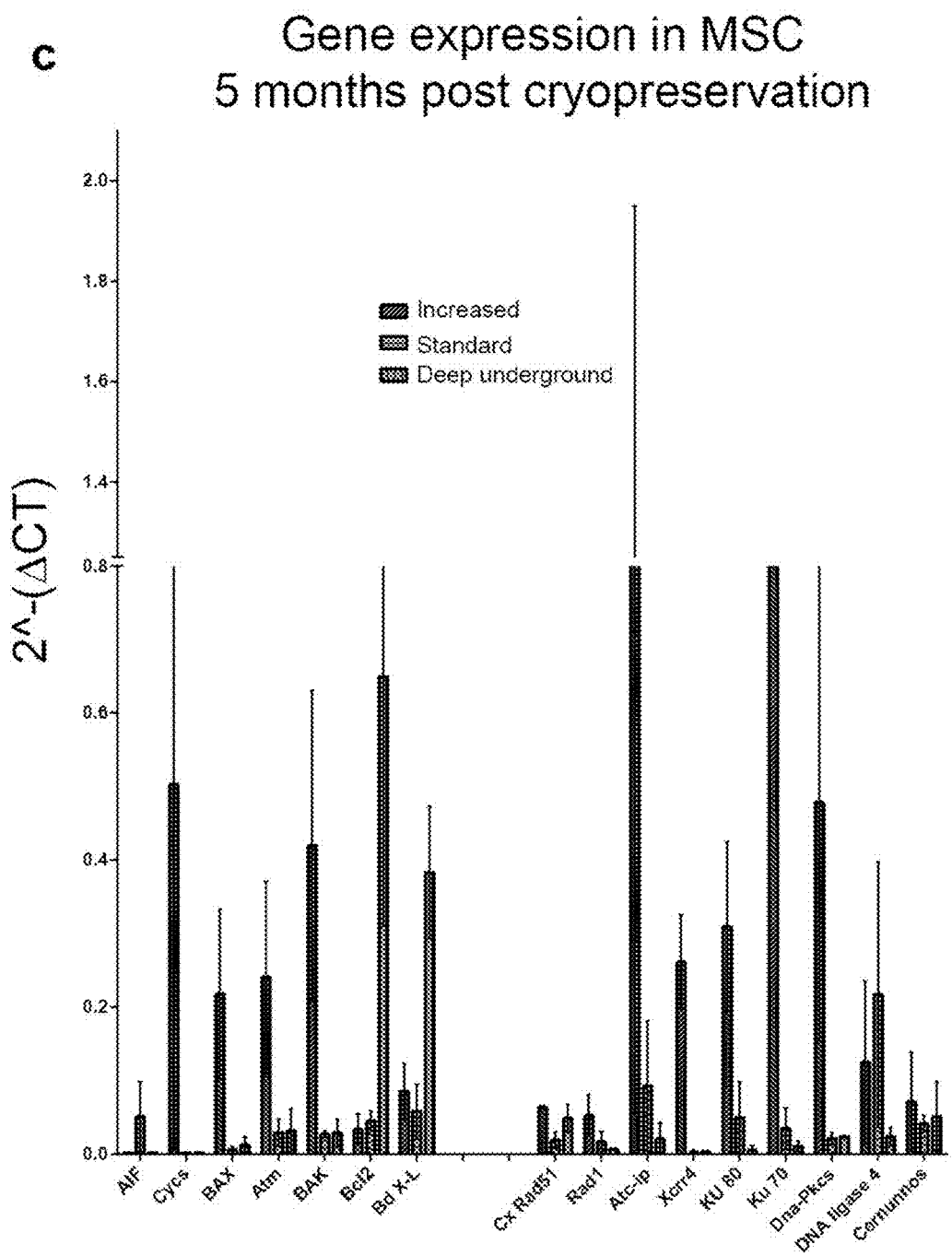
Figure 7 (Continue)

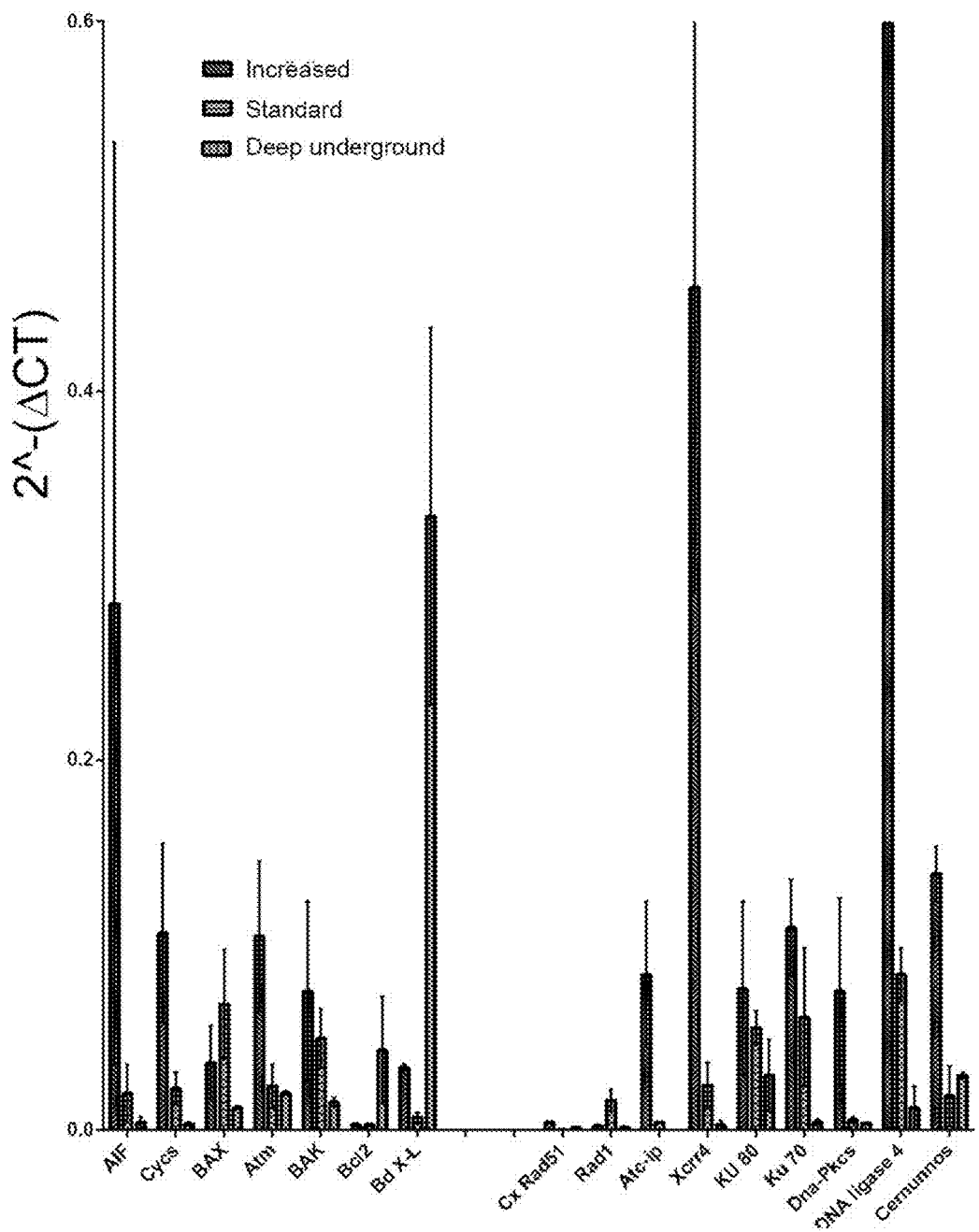
Figure 8 (Continue)

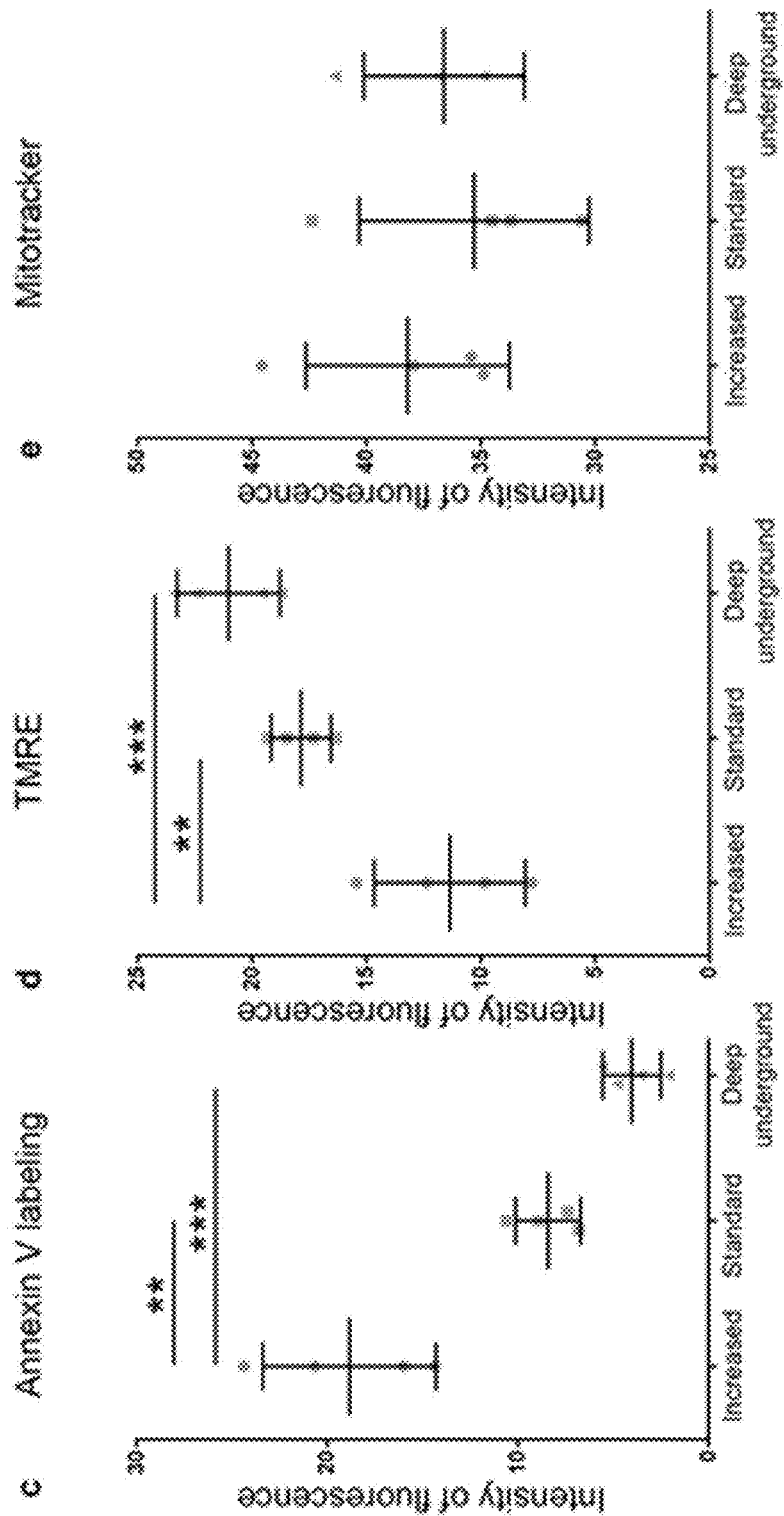
Figure 8 (Continue)

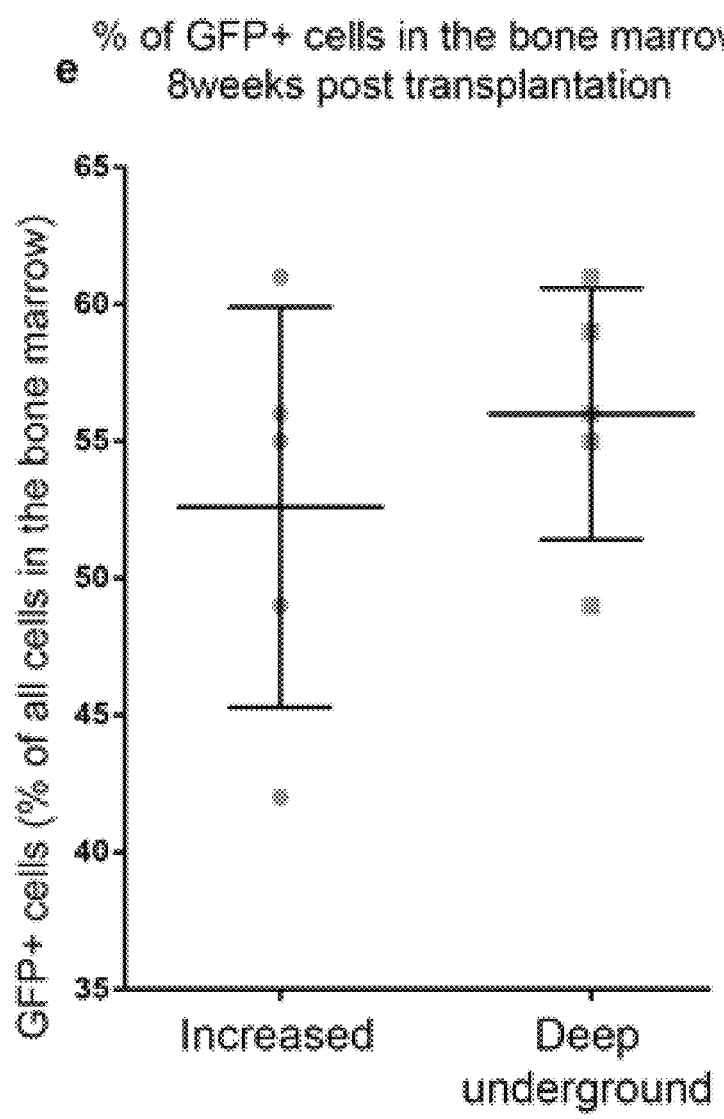
Figure 9 (Continue)

HIGH-FIDELITY LONG-TERM STORAGE OF BIOLOGICAL MATERIAL

RELATED APPLICATIONS

This application is a National Stage Application under 35 U.S.C. 371 of co-pending PCT application PCT/EP2018/078569 designating the United States and filed Oct. 18, 2018; which claims the benefit of EP application number 17306409.8 and filed Oct. 18, 2017 each of which are hereby incorporated by reference in their entireties.

TECHNICAL FIELD

The present invention relates to the long-term preservation of biological material, more specifically to a method as well as a container adapted therefor.

TECHNOLOGICAL BACKGROUND

Adult stem cells are an essential component of tissue homeostasis and repair: they support ongoing tissue regeneration, replacing cells lost through natural cell death or injury. Stem cells having the ability to build every tissue in the human body, they have a great potential for therapeutic uses, in particular in tissue regenerative medicine. It is expected that two third of the diseases will be tackled thanks to stem cells therapy by 2050, as exemplified by the number of ongoing clinical trials (5516 clinical trials ongoing on 6 Jun. 2016; source: clinicaltrial.gov).

Therapeutic applications in connection with stem cells are designed to take advantage of their trophic properties (anti-scarring, anti-apoptotic, angiogenic, mitogenic), immuno-modulatory effects and anti-microbial effects. Currently envisaged applications using stem cells concern therapeutic areas as diverse as:

- orthopaedics and spine therapies, such as fracture repair, osteonecrosis, spine fusion, cartilage repair, arthrosis;
- cardiovascular therapies, in the treatment of cardiac and vascular diseases;
- wounds and tissue repair, in particular in the treatment of wounds, ulcer and burns;
- treatment of neural disorders, including multiple sclerosis, amyotrophic lateral sclerosis, Parkinson's disease, stroke and spinal cord injury;
- treatment of autoimmune disorders such as rheumatoid arthritis, Crohn's disease, lupus erythematosus and asthma;
- oncology, in particular in the treatment of leukaemia.

But in spite of the intensity of research in this field, potent stem cells are still not readily available, in particular because of the difficulty in purifying them and of the cost associated therewith. Although technical solutions have been developed to overcome these shortcomings, other obstacles—including shortages in the number of matching donors, as well as safety of use and ethics—still limit their widespread use.

To overcome these issues, a seemingly straightforward solution is to store stem cells—in particular from the umbilical cord and foetal blood—in banks for later allograft or autograft.

This requires preserving the stem cells' genetic integrity and their ability to "be awaken" for several decades.

To this end, stem cells are stored under stasis—today achieved thanks to storage at 77 Kelvin—which prevents any chemical or metabolic activity to degrade DNA, but also stops the continuous DNA repair mechanisms. As a result, DNA defects (such as double strand breaks) and production of reactive oxygen species inevitably accumulate upon storage. Cells may thus be so damaged upon thawing that they may be unsuitable for therapeutic purposes, or worst that could hurt the patients.

The same is true for gametes (spermatozoid and egg cell) or eggs, which are in particular sampled on (generally young) individuals before chemotherapy, and may be used after many-years preservation in a cell bank.

This is all the truer of cryogeny of body parts (such as heads) or even whole bodies, already in use in some countries, in particular by people suffering from currently non-treatable diseases, in the hope that cures will be developed in the (near) future.

Long-period preservation is thus a major issue—not necessarily fully recognized yet—for cell banks and for companies storing bodies or body parts.

The same problem will arise even more sharply with "data-archiving" DNA, currently developed as an alternative to computer hard-drives and CD-ROMs—as centuries (as with books made of ink and paper) rather than decades are considered with information and data storage.

There is thus a need for "high-fidelity" methods for preserving the genetic integrity of biological materials over long periods of time, i.e. several decades or even centuries, and for containers useful in such methods.

SUMMARY OF INVENTION

In this framework, the Inventors hypothesized that the major source of DNA and other biological material damage to be taken into account is ionising radiations, the most dangerous of which are gamma-rays and neutrons. Indeed, external alpha-rays and electrons are easily stopped by a mere wall: their contribution to the overall radiation dose received by the cells upon storage may thus be neglected.

Gamma-rays are high-energy photons. They interact indirectly with matter: gamma-rays randomly communicate part of their energy to electrons). These electrons then interact with biological material such as cells, producing radicals and/or reactive oxygen species (ROS), in particular through radiolysis of water.

Neutrons interact with atoms' nuclei. By elastic scattering, they communicate part of their energy to the DNA atoms' nuclei, directly breaking DNA chains. They may also communicate part of their energy to protons nearby (Hydrogen atoms), which will then damage DNA.

Gamma Rays mainly originate from natural radioactivity, while neutrons stem from both natural radioactivity and cosmic-rays (mainly muons at the sea level and underground).[20, 22]

Reduction of fast neutrons induced by cosmic-rays interactions is directly correlated with the reduction of the cosmic-rays flux.

To suppress the remaining fast neutrons resulting from cosmic-rays interactions and natural radioactivity, a shielding with materials including hydrogen atoms are used to slow down the neutrons (i.e. decrease their energy) to thermal energy level (0.025 eV): they then have no direct influence on the cells.

The Inventors have thus designed a preservation container specially aimed at attenuating the overall radiation dose received by the biological material upon storage.

Therefore, in a first aspect, the present invention relates to concerns a preservation container comprising:
- a biological container for containing biological material,
- a first shield configured for absorbing gamma-rays, a second shield configured for absorbing ambient neutrons, said second shield surrounding the biological container, the preservation container being of low-radioactivity background materials.

To better preserve the biological material from cosmic-rays and induced secondary particles ($10^{-2}$ neutron induced by cosmic-rays by centimeter square and per second at ground level may interact with the biological material even when stored in the preservation container of the invention), the Inventors have further designed a preservation method, involving in particular "(deep) underground" storage of the preservation container.

Thus, in a second aspect, the present invention relates to a method for preserving a biological material, comprising:
a) providing a biological material in a confinement container,
b) providing the preservation container of the invention,
c) placing the confinement container containing the biological material into said preservation container,
d) storing said preservation container containing the biological material in a room located under a material attenuating cosmic rays and induced secondary particles, said material having a thickness equivalent to 1 m to 7000 m of water for cosmic ray attenuation.

The method of the invention thus allows for preserving the integrity of the genetic information of the biological material for extended periods of time in particular up to 100 years (i.e. between 1 and 100 years), and usually for 30 to 80 years.

DEFINITIONS

As used herein, a "low radioactivity background material" refers to a material with a radioactivity of preferably 10 Bq/kg or less.

As used herein, "gamma rays" is understood as a penetrating electromagnetic radiation arising from the radioactive decay of atomic nuclei. It consists of photons in the highest observed range of photon energy. Gamma rays are able to ionize atoms (ionizing radiation), and are thus biologically hazardous. The decay of an atomic nucleus from a high energy state to a lower energy state, a process called gamma decay, produces gamma radiations.

As used herein, a "material absorbing gamma rays" is understood as a material capable of attenuating gamma rays. Therefore, the expressions "material absorbing gamma-rays" and "material attenuating gamma-rays" will be considered as synonyms in the following, and will be used indifferently. In an advantageous embodiment, said material absorbing gamma-rays fully absorbs gamma rays, i.e. no high energy electrons are detectable beyond said material.

The attenuation of the naturally occurring gamma rays is typically calculated as follows.

For an initial gamma-ray emission $I_0$, after crossing a material or a compound with a thickness e (cm), a density ρ (in g·cm$^{-3}$) and a total attenuation coefficient μ (cm$^2$/g), Ie flux I without interaction is:

$$I/I_0 = e^{-((\mu \cdot \rho) \times e)}$$

The most common material is selected from lead, copper, water, steal.

Total attenuation coefficient standards for gamma-rays can be found on the website of the National Institute of Standards and Technology (NIST): https://www.nist.gov/pml/xcom-photon-cross-sections-database. The tables for gamma-rays for lead and water are given below.

TABLE 1

(for Lead): Photon Cross Sections Data for lead, generated from XCOM (https://physics.nist.gov/cgi-bin/Xcom/xcom3_1-t)
Partial and total attenuation coefficients for photons in Lead for various energies NIST Standard Reference Database 8 (XGAM) M.J. Berger, J.H. Hubbell, S.M. Seltzer, J. Chang, J.S. Coursey, R. Sukumar, D.S. Zucker, and K. Olsen NIST, PML, Radiation Physics Division.

| PHOTON ENERGY (MeV) | SCATTERING COHERENT (cm2/g) | SCATTERING INCOHER. (cm2/g) | PHOTO-ELECTRIC ABSORPTION (cm2/g) | PAIR PRODUCTION IN NUCLEAR FIELD (cm2/g) | PAIR PRODUCTION IN ELECTRON FIELD (cm2/g) | TOTAL WITH COHERENT SCATT. (cm2/g) | ATTENUATION WITHOUT COHERENT SCATT. (cm2/g) |
|---|---|---|---|---|---|---|---|
| 1.000E−03 | 1.251E+01 | 3.587E−03 | 5.197E+03 | 0.000E+00 | 0.000E+00 | 5.209E+03 | 5.197E+03 |
| 5.000E−03 | 8.208E+00 | 2.516E−02 | 7.222E+02 | 0.000E+00 | 0.000E+00 | 7.305E+02 | 7.223E+02 |
| 1.000E−02 | 4.982E+00 | 4.540E−02 | 1.256E+02 | 0.000E+00 | 0.000E+00 | 1.306E+02 | 1.257E+02 |
| 1.000E−01 | 2.128E−01 | 9.894E−02 | 5.237E+00 | 0.000E+00 | 0.000E+00 | 5.549E+00 | 5.336E+00 |
| 2.000E−01 | 6.260E−02 | 8.966E−02 | 8.464E−01 | 0.000E+00 | 0.000E+00 | 9.986E−01 | 9.360E−01 |
| 4.000E−01 | 1.746E−02 | 7.310E−02 | 1.417E−01 | 0.000E+00 | 0.000E+00 | 2.323E−01 | 2.148E−01 |
| 5.000E−01 | 1.143E−02 | 6.734E−02 | 8.257E−02 | 0.000E+00 | 0.000E+00 | 1.613E−01 | 1.499E−01 |
| 6.000E−01 | 8.060E−03 | 6.263E−02 | 5.406E−02 | 0.000E+00 | 0.000E+00 | 1.248E−01 | 1.167E−01 |
| 8.000E−01 | 4.621E−03 | 5.537E−02 | 2.871E−02 | 0.000E+00 | 0.000E+00 | 8.870E−02 | 8.408E−02 |
| 1.000E+00 | 2.991E−03 | 4.993E−02 | 1.810E−02 | 0.000E+00 | 0.000E+00 | 7.102E−02 | 6.803E−02 |
| 2.000E+00 | 7.626E−04 | 3.482E−02 | 5.034E−03 | 5.450E−03 | 0.000E+00 | 4.607E−02 | 4.530E−02 |
| 4.000E+00 | 1.919E−04 | 2.290E−02 | 1.723E−03 | 1.712E−02 | 3.906E−05 | 4.198E−02 | 4.178E−02 |
| 6.000E+00 | 8.542E−05 | 1.749E−02 | 9.894E−04 | 2.523E−02 | 1.191E−04 | 4.391E−02 | 4.382E−02 |
| 8.000E+00 | 4.807E−05 | 1.431E−02 | 6.845E−04 | 3.151E−02 | 2.000E−04 | 4.675E−02 | 4.670E−02 |
| 1.000E+01 | 3.078E−05 | 1.219E−02 | 5.203E−04 | 3.671E−02 | 2.740E−04 | 4.972E−02 | 4.969E−02 |
| 2.000E+01 | 7.696E−06 | 7.243E−03 | 2.334E−04 | 5.403E−02 | 5.415E−04 | 6.206E−02 | 6.205E−02 |
| 5.000E+01 | 1.231E−06 | 3.496E−03 | 8.699E−05 | 7.606E−02 | 9.120E−04 | 8.056E−02 | 8.056E−02 |

TABLE 2

(for Water): Photon Cross Sections Data for water, generated from XCOM
(https://physics.nist.gov/cgi-bin/Xcom/xcom3_2-t)
Partial and total attenuation coefficients for photons in Lead for various energies NIST Standard
Reference Database 8 (XGAM) M.J. Berger, J.H. Hubbell, S.M. Seltzer, J. Chang, J.S. Coursey,
R. Sukumar, D.S. Zucker, and K. Olsen NIST, PML, Radiation Physics Division.

| PHOTON ENERGY (MeV) | SCATTERING COHERENT (cm2/g) | SCATTERING INCOHER. (cm2/g) | PHOTO-ELECTRIC ABSORPTION (cm2/g) | PAIR PRODUCTION IN NUCLEAR FIELD (cm2/g) | PAIR PRODUCTION IN ELECTRON FIELD (cm2/g) | TOTAL ATTENUATION WITH COHERENT SCATT. (cm2/g) | TOTAL ATTENUATION WITHOUT COHERENT SCATT. (cm2/g) |
|---|---|---|---|---|---|---|---|
| 1.000E−03 | 1.372E+00 | 1.319E−02 | 4.076E+03 | 0.000E+00 | 0.000E+00 | 4.077E+03 | 4.076E+03 |
| 5.000E−03 | 5.579E−01 | 1.123E−01 | 4.192E+01 | 0.000E+00 | 0.000E+00 | 4.259E+01 | 4.203E+01 |
| 1.000E−02 | 2.305E−01 | 1.550E−01 | 4.944E+00 | 0.000E+00 | 0.000E+00 | 5.330E+00 | 5.099E+00 |
| 1.000E−01 | 5.349E−03 | 1.626E−01 | 2.763E−03 | 0.000E+00 | 0.000E+00 | 1.707E−01 | 1.654E−01 |
| 2.000E−01 | 1.388E−03 | 1.353E−01 | 2.887E−04 | 0.000E+00 | 0.000E+00 | 1.370E−01 | 1.356E−01 |
| 4.000E−01 | 3.506E−04 | 1.058E−01 | 3.493E−05 | 0.000E+00 | 0.000E+00 | 1.061E−01 | 1.058E−01 |
| 5.000E−01 | 2.247E−04 | 9.663E−02 | 1.883E−05 | 0.000E+00 | 0.000E+00 | 9.687E−02 | 9.665E−02 |
| 6.000E−01 | 1.561E−04 | 8.939E−02 | 1.173E−05 | 0.000E+00 | 0.000E+00 | 8.956E−02 | 8.940E−02 |
| 8.000E−01 | 8.790E−05 | 7.856E−02 | 5.920E−06 | 0.000E+00 | 0.000E+00 | 7.866E−02 | 7.857E−02 |
| 1.000E+00 | 5.627E−05 | 7.066E−02 | 3.681E−06 | 0.000E+00 | 0.000E+00 | 7.072E−02 | 7.066E−02 |
| 2.000E+00 | 1.407E−05 | 4.901E−02 | 1.063E−06 | 3.908E−04 | 0.000E+00 | 4.942E−02 | 4.940E−02 |
| 4.000E+00 | 3.519E−06 | 3.216E−02 | 4.075E−07 | 1.812E−03 | 5.507E−05 | 3.403E−02 | 3.402E−02 |
| 6.000E+00 | 1.564E−06 | 2.454E−02 | 2.484E−07 | 2.987E−03 | 1.685E−04 | 2.770E−02 | 2.770E−02 |
| 8.000E+00 | 8.796E−07 | 2.008E−02 | 1.780E−07 | 3.927E−03 | 2.843E−04 | 2.429E−02 | 2.429E−02 |
| 1.000E+01 | 5.630E−07 | 1.710E−02 | 1.386E−07 | 4.699E−03 | 3.910E−04 | 2.219E−02 | 2.219E−02 |
| 2.000E+01 | 1.407E−07 | 1.016E−02 | 6.555E−08 | 7.186E−03 | 7.878E−04 | 1.813E−02 | 1.813E−02 |
| 5.000E+01 | 2.252E−08 | 4.906E−03 | 2.534E−08 | 1.045E−02 | 1.385E−03 | 1.674E−02 | 1.674E−02 |

The most energetic gamma-ray from natural radioactivity is the 2.6 MeV from 208Tl. A reduction by a 100 factor on this gamma-ray line implies a thickness of about 100 cm of water or 9 cm lead for the first shield. Gamma-rays with lower energy will be more strongly attenuated.

With an attenuation of the ambient natural radioactivity gamma-ray flux by a 100 factor, the remaining ambient gamma-ray flux going through the first shield will be equivalent to the gamma-ray flux emitted by the preservation container materials with an activity of 10 Bq/kg in gamma ray emitters. This 10 Bq/kg are the low-background mark for materials of the first shield.

For an attenuation $A_1$ of ambient gamma-rays greater than 100, the total activity of preservation container materials is to be linearly decreased by a factor $10*(100/A_1)$.

As used herein, "ambient neurons" are understood as neutrons coming from cosmic-rays (muons) interactions and natural radioactivity.

As used herein, a "material absorbing ambient neutrons" is understood as a material capable of attenuating the level of ambient neutrons generated in particular by gamma-rays. Therefore, the expressions "material absorbing cosmic rays" and "material attenuating cosmic rays" will be considered as synonyms in the following, and will be used indifferently. In an advantageous embodiment, said material also fully absorbs cosmic rays, i.e. no high energy neutrons other than ambient neutrons are detectable beyond said material.

As used herein, "cosmic rays", or "terrestrial cosmic rays" or "secondary cosmic rays" (these terms are synonymous in the context of the present invention) is understood as the secondary particles produced by the primary high-energy radiations composed of high-energy particles (protons, gamma-rays, . . . ) and atomic nuclei coming from the Sun or from astrophysics processes in the Universe (Supernovae, active nuclei of galaxies) by interactions with the Earth's atmosphere. These interactions produce showers of secondary particles that sometimes reach the Earth's surface.

As used herein, "secondary particles" or "induced particles" are understood as particles produced by interactions of cosmic-rays with matter, such as for instance spallation reactions of muons with matter, leading to the creation of high energy neutrons.

The neutron attenuation, in particular created by cosmic-rays, is for instance calculated as follows.

The most dangerous neutrons are the "fast" neutrons, neutrons from muon capture and neutrons from natural radioactivity. FIG. 13 shows how to reduce fast neutrons from cosmic rays.

A simplified approach commonly used is to consider that the attenuation flux law behaves as:

$$I/I_0 = e^{(-\Sigma \cdot d)}$$

$I_0$: initial neutron flux, $\Sigma$: removal neutron cross section (see reference 25 or 26), d: thickness of material.

It is also possible to use a simulation method such as MCNP (available at https://mcnp.lanl.gov/) or GEANT 4 (available at http://geant4.cern.ch/).

As used herein, "mwe" stands for meter-equivalent water, which is the unit used for measuring cosmic ray attenuation. This unit is self-explanatory: 1 mwe is the thickness of a material equivalent to 1 meter of water with regard to cosmic ray attenuation.[21]

As used herein, a "biological material" is understood as a material containing genetic information such as DNA and/or RNA. By extension, a biological material includes peptides and proteins: as they are the result of the translation of genetic information, they may be considered as containing genetic information themselves.

As used herein, a "living biological material" is understood as a biological material able to live and reproduce without the help of a host. In particular, DNA, RNA, peptides and proteins are not considered as living materials (since they need enzymes and proteins to be replicated and/or be translated). Viruses are also not considered as living materials (since they need the proteic and enzymatic machinery of their host cell to replicate).

The term "amino acid" as used in the present invention refers to natural α-amino acids (e.g. Alanine (Ala), Arginine (Arg), Asparagine (Asn), Aspartic acid (Asp), Cysteine (Cys), Glutamine (Gln), Glutamic acid (Glu), Glycine (Gly), Histidine (His), Isoleucine (Ile), Leucine (Leu), Lysine (Lys), Methionine (Met), Phenylalanine (Phe), Proline (Pro), Serine (Ser), Threonine (Thr), Tryptophan (Trp), Tyrosine (Tyr) and Valine (Val)) in the D or L form, as well as non-natural amino acid (e.g. β-alanine, allylglycine, tert-leucine, 3-amino-adipic acid, 2-aminobenzoic acid, 3-aminobenzoic acid, 4-aminobenzoic acid, 2-aminobutanoic acid, 4-amino-1-carboxymethyl piperidine, 1-amino-1-cyclobutanecarboxylic acid, 4-aminocyclohexaneacetic acid, 1-amino-1-cyclohexanecarboxylic acid, (1R,2R)-2-aminocyclohexanecarboxylic acid, (1R,2S)-2-aminocyclohexanecarboxylic acid, (1S,2R)-2-aminocyclohexanecarboxylic acid, (1S,2S)-2-aminocyclohexanecarboxylic acid, 3-aminocyclohexanecarboxylic acid, 4-aminocyclohexanecarboxylic acid, (1R,2R)-2-aminocyclopentanecarboxylic acid, (1R,2S)-2-aminocyclopentanecarboxyilic acid, 1-amino-1-cyclopentanecarboxylic acid, 1-amino-1-cyclopropanecarboxylic acid, 4-(2-aminoethoxy)-benzoic acid, 3-aminomethylbenzoic acid, 4-aminomethylbenzoic acid, 2-aminobutanoic acid, 4-aminobutanoic acid, 6-aminohexanoic acid, 1-aminoindane-1-carboxylic acid, 4-aminomethyl-phenylacetic acid, 4-aminophenylacetic acid, 3-amino-2-naphtoic acid, 4-aminophenylbutanoic acid, 4-amino-5-(3-indolyl)-pentanoic acid, (4R,5S)-4-amino-5-methylheptanoic acid, (R)-4-amino-5-methylhexanoic acid, (R)-4-amino-6-methylthiohexanoic acid, (S)-4-amino-pentanoic acid, (R)-4-amino-5-phenylpentanoic acid, 4-aminophenylpropionic acid, (R)-4-aminopimeric acid, (4R,5R)-4-amino-5-hyroxyhexanoic acid, (R)-4-amino-5-hydroxypentanoic acid, (R)-4-amino-5-(p-hydroxyphenyl)-pentanoic acid, 8-aminooctanoic acid, (2S,4R)-4-amino-pyrrolidine-2-carboxylic acid, (2S,4S)-4-amino-pyrrolidine-2-carboxylic acid, azetidine-2-carboxylic acid, (2S,4R)-4-benzyl-pyrrolidine-2-carboxylic acid, (S)-4,8-diaminooctanoic acid, tert-butylglycine acid, γ-carboxyglutamate, β-cyclohexylalanine, citrulline, 2,3-diamino propionic acid, hippuric acid, homocyclohexylalanine, moleucine, homophenylalanine, 4-hydroxyproline, indoline-2-carboxylic acid, isonipecotic acid, α-methyl-alanine, nicopetic acid, norleucine, norvaline, octahydroindole-2-carboxylic acid, ornithine, penicillamine, phenylglycine, 4-phenyl-pyrrolidine-2-carboxylic acid, pipecolic acid, propargylglycine, 3-pyridinylalanine, 4-pyridinylalanine, 1-pyrrolidine-3-carboxylic acid, sarcosine, statines, tetrahydroisoquinoline-1-carboxylic acid, 1,2,3,4-tetrahydroisoquinoline-3-carboxylic acid, or tranexamic acid). Preferably, it will be a natural or non-natural α-amino acid and preferably a natural α-amino acid.

As used herein, a "peptide" is understood as a chain comprising 2 to 10 amino acids as defined above (and preferably natural α-amino acid) bound together by means of peptide bounds (i.e. amide function).

As used herein, a "protein" is understood as a chain comprising 10 or more amino acids as defined above (and preferably natural α-amino acid) bound together by means of peptide bounds (i.e. amide function).

As used herein, "DNA" or DesoxyriboNucleic Acid refers to a single or double strand polynucleotide composed of simpler monomer units called nucleotides. Each nucleotide is composed of one of four nitrogen-containing nucleobases—cytosine (C), guanine (G), adenine (A), or thymine (T)—a sugar called deoxyribose, and a phosphate group. The nucleotides are joined to one another in a chain by covalent bonds between the sugar of one nucleotide and the phosphate of the next, resulting in an alternating sugar-phosphate backbone. In double stranded DNA, the nitrogenous bases of the two separate polynucleotide strands are bound together, according to base pairing rules (A with T, and C with G), with hydrogen bonds.

As used herein, "RNA" or RiboNucleic Acid is understood as a single or double strand polynucleotide composed of simpler monomer units called nucleotides. Each nucleotide is composed of one of four nitrogen-containing nucleobases—cytosine (C), guanine (G), adenine (A), or uracil (U)—a sugar called ribose, and a phosphate group. The nucleotides are joined to one another in a chain by covalent bonds between the sugar of one nucleotide and the phosphate of the next, resulting in an alternating sugar-phosphate backbone. In double stranded RNA, the nitrogenous bases of the two separate polynucleotide strands may be bound together, according to base pairing rules (A with U, and C with G), with hydrogen bonds. However, RNA is usually found as single-strands.

As used herein, a "tissue" is understood as an ensemble of similar cells from the same origin that together carry out a specific function. Examples of tissues are connective tissues (matrixes), muscle, epithelium (such as skin), nervous tissue (central nervous system or peripheral nervous system).

As used herein, an "organ" is understood as a collection of tissues joined in a structural unit to serve a common function. An organ is usually composed of a number of different tissues.

As used herein, a "zygote" refers to a eukaryotic cell formed by a fertilization event between two gametes (i.e. it is an egg). The zygote's genome is a combination of the DNA in each gamete, and contains all of the genetic information necessary to form a new individual. In multicellular organisms, the zygote is the earliest developmental stage. In single-celled organisms, the zygote can divide asexually by mitosis to produce identical offspring. Preferably, the zygote is an egg.

As used herein, "stem cells" are understood as cells able to self-renew and differentiate into different tissues and organs. Examples of suitable stem cells according to the invention include, without limitation, embryonic stem cells; totipotent stem cells; induced totipotent stem cells; pluripotent stem cells including notably induced pluripotent stem cells; multipotent stem cells; induced multipotent stem cells; adult stem cells; progenitors and stem cells of any origin such as neuronal stem cells, myogenic stem cells (i.e. satellite cells, which are Pax7+ and CD34+), hematopoietic stem cells (HSCs), mesenchymal stem cells (MSCs), bone-marrow-derived MSCs, epithelial stem cells such as skin or intestinal stem cells, and adipose tissue-derived stem cells. Particularly preferred stem cells according to the invention are mesenchymal stem cells (MSCs); more preferably, cord blood extracted at birth stem cells and hematopoietic stem cells. Examples of suitable differentiated cells according to the invention include, without limitation, cells of any origin such as neurons, myogenic cells (i.e. myoblasts or myocytes), hematopoietic cells, epithelial cells, osteoblasts, osteocytes, chondrocytes, blood cells, keratinocytes, melanocytes, fibroblasts, Merkel cells, Langerhans cells, adipocytes, and endothelial cells.

DETAILED DESCRIPTION

1. Preservation Container

The present invention concerns a preservation container comprising:
- a biological container for containing biological material,
- a first shield configured for absorbing gamma-rays,
- a second shield configured for absorbing ambient neutrons, said second shield surrounding the biological container,
- the preservation container being of low-radioactivity background materials.

1.1. Preservation Container

The preservation container consists of low-radioactivity background materials. Preferably, the low-radioactivity background materials have a radioactivity of 10 Bq/kg or less. Advantageously, they have a radioactivity of 1 Bq/kg or less, more preferably of 0.1 Bq/kg or less, even more preferably of 0.01 Bq/kg or less.

For instance, the preservation container comprises low-radioactivity background steel, and may further comprise a thermal insulator, such as polystyrene or a superinsulator (like Cryogenic Insulation Coolcat), preferably under vacuum.

Advantageously, to further lower the ambient radioactivity within the preservation container, a fluid of less than 1 Bq/m$^3$, in particular a radon-free fluid, stands and/or circulates around and/or within the biological container, such as radon-free air, nitrogen or argon.

1.2. Biological Container

The biological container is configured to contain the biological material, which is preferably stored in a confinement container, such as a (plastic) tube advantageously suitable for cryogenisation, preferably a low-radioactivity background (plastic) tube suitable for cryogenisation.

1.3. First Shield

Advantageously, the first shield has a gamma-ray attenuation factor equivalent to 10 cm to 15 cm of lead.

Examples of materials absorbing gamma rays suitable as first shield are in particular low-radioactivity background metals, such as low-radioactivity background lead, low-radioactivity background iron, low-radioactivity background steel, low-radioactivity background copper, or mixtures thereof, preferably it is low-radioactivity background steel or mixtures thereof with low-radioactivity background lead.

Particularly preferred are first shields consisting of low-radioactivity background metals such as low-radioactivity background steel or mixtures thereof with low-radioactivity background lead.

The first shield is not particularly limited in terms of shape as long as it is suitable for absorbing gamma-rays and properly ensures its shielding function with regard to the biological container.

1.4. Second Shield

The second shield preferably has a neutron attenuation factor equivalent to 30 cm to 100 cm of water, preferably to 30 to 50 cm of water.

Preferably, the material configured for absorbing ambient neutrons is a hydrogen-rich material.

As used herein, a "hydrogen-rich material" is advantageously an electrically neutral material containing covalent carbon-hydrogen or heteroatom-hydrogen bonds. In hydrogen-rich materials, heteroatoms are not metals, and are preferably selected from O, S, N, Si, P. Advantageously, the hydrogen-rich material contains 1 hydrogen atom for at most 5 atoms. Examples of hydrogen-rich materials are water and hydrogen-rich organic materials such as hydrogen containing polyolefins (in particular non-chlorinated hydrogen rich polyolefins), paraffin, or wood.

Particularly preferred are second shields consisting of paraffin (in particular containing 17 wt % of hydrogen atom), polyethylene (in particular containing 14 wt % of hydrogen atom), and/or water (containing 12 wt % hydrogen atom).

The second shield is not particularly limited in terms of shape as long as it is suitable for absorbing neutron and properly ensures its shielding function with regard to the biological container.

1.5. Spatial Arrangements

The spatial arrangement of the preservation may vary, but the biological container is typically shielded by the first and second shields, i.e. the biological container is contained within the first and the second shield.

In a first embodiment, the first shield is located between the biological container and the second shield.

In a second embodiment, the second shield surrounds the biological container and is located within the first shield.

1.6. Cryostat

In a preferred embodiment, the preservation container is a cryostat, and further comprises a cryogenic container, said cryogenic container containing a cold source and defining a chamber for containing the biological container. The cold source may be a cryogenic fluid or a heat engine.

When the cold source is a cryogenic fluid, the biological container may be located within or above (however in freezing proximity with) the cryogenic fluid. Alternatively, the biological container may be in contact with the cold source through a thermic transfer device, such as a metallic line, which allows keeping the biological container at low temperature. In the latter case, the biological container is not necessarily above the cryogenic fluid, and the cryogenic fluid may be kept in a reservoir connected to the preservation container, the reservoir not being part of the preservation container.

The cryogenic fluid is typically liquid nitrogen or argon, preferably liquid nitrogen.

The spatial arrangement of the preservation container may vary. For instance, in a first embodiment, the first shield surrounds the biological container and is located within the cryogenic container. In this embodiment, the second shield preferably surrounds the cryogenic container.

In a second embodiment, the first shield is located between the cryogenic container and the second shield.

In a third embodiment, the second shield is located within the first shield.

In a fourth embodiment, the biological container is located in a cryogenic container. The cryogenic container defines a chamber for storing the biological container, and a chamber for containing the cold source, here a cryogenic fluid. The biological container is cooled thanks to a metallic thermic transfer line, which is immersed within the cryogenic liquid (i.e. going from one chamber to the other in the cryogenic container). The thermic transfer line is a tube which allows also the transfer of cryogenic fluid from the main reservoir to the cell container. The first shield surrounds only the chamber containing the biological container, while the second shield surrounds the whole of the cryogenic container, including the first shield.

In a fifth embodiment, the transfer line is non-conductive and insures the transfer of cryogenic fluid from the cryogenic reservoir to the cryogenic container. The cryogenic chamber is an "alarm chamber", connected to a regular cryostat, used as a cryogenic liquid reservoir. If the cryogenic fluid transfer with the reservoir is faulty, then the "alarm" cryogenic chamber takes over so that the biological container is still kept at low temperature. The cryogenic liquid reservoir is not necessary aligned with the biological container.

In a sixth embodiment, the first shield surrounds cryogenic chamber containing the biological container (and thermal insulator) and is located within the second shield. The cryogenic chamber is an "alarm chamber", connected to a regular cryostat, used as a cryogenic liquid reservoir. If the cryogenic fluid transfer with the reservoir is faulty, then the "alarm" cryogenic chamber takes over so that the biological container is still kept at low temperature. The cryogenic liquid reservoir is not necessary aligned with the biological container Advantageously, a fluid of less than 1 $Bq/m^3$ (more preferably of 0.1 Bq/kg or less, even more preferably of 0.01 Bq/kg or less), in particular a radon-free fluid, stands and/or circulates around and/or within the cryogenic container, such as radon-free air, nitrogen or argon. Preferably, it is nitrogen or argon. When the cold source is a cryogenic liquid, the fluid is preferably the gaseous counterpart of said fluid. For instance, when the cryogenic liquid is liquid nitrogen, the fluid is preferably gaseous nitrogen.

1.7. Preferred Embodiments

Every combination of particular and preferred embodiments of the preservation container are encompassed by the invention.

In particular, the preservation container is preferably a cryostat as defined above in 1.5. The first shield of the cryostat preferably consists of low-radioactivity background copper, steel or mixtures thereof with low-radioactivity background lead. Advantageously, the second shield consists of paraffin (in particular containing 17 wt % of hydrogen atom), polyethylene (in particular containing 14 wt % of hydrogen atom), and/or water (containing 12 wt % hydrogen atom).

Preferably, in this embodiment, the biological container is in contact with the cold source through a thermic transfer device, such as a metallic line, which allows keeping the biological container at low temperature. In the latter case, the biological container is not necessarily above the cryogenic fluid, and the cryogenic fluid may be kept in a reservoir connected to the preservation container, the reservoir not being part of the preservation container.

2. Method for Preserving a Biological Material

The present invention further concerns a method for preserving a biological material, comprising:
a) providing a biological material in a confinement container,
b) providing the preservation container of the invention,
c) placing the confinement container containing the biological material into the biological container of said preservation container,
d) storing said preservation container containing the biological material in a room located under a material attenuating cosmic rays and induced particles, said material having a thickness equivalent to 1 m to 7000 m of water for cosmic ray attenuation.

2.1. Confinement Container

The confinement container is a typical biological storage container, preferably hermetic.

It is preferably a (plastic) sealable tube advantageously suitable for cryogenisation, preferably a low-radioactivity background (plastic) sealable tube suitable for cryogenisation.

2.2. Material Attenuating Cosmic Rays

The thickness of the material depends on the average fast neutron energy. For neutrons from natural radioactivity, the average energy is about 2 MeV, so that a 30 cm water-equivalent material reduces the flux by a 1000 factor. Overall, the thickness and material will be chosen by the skilled artisan as a function of the required attenuation for fast neutrons.

Advantageously, the material attenuating cosmic rays and their induced secondary particles has a thickness ranging from 1 mwe to 5000 mwe, such as to 1 mwe to 3000 mwe (for cosmic ray attenuation).

The material attenuating cosmic rays advantageously comprises at least earth, rock, water and/or concrete. In a particular embodiment, the material attenuating cosmic rays is earth, rock, water and/or concrete.

2.3. Limiting Ambient Radioactivity within the Room of Step d)

In a preferred embodiment, to further decrease the level of ambient radioactivity within the room of step d):
a fluid with a radioactivity of less than 1 $Bq/m^3$, preferably of less than 0.1 $Bq·m^3$, in particular a radon-free fluid, stands and/or circulates around and/or within the biological container, and/or
the room contains a radon-free atmosphere of less than 1 $Bq/m^3$, preferably of less than 0.1 $Bq·m^3$, in particular a radon-free atmosphere.

The fluid and the atmosphere are preferably radon-free air, gaseous nitrogen or gaseous argon.

2.4. Storing Temperature

Genetic material itself, when preserved as isolated genetic material, may be preserved at ambient temperature (i.e.e between 50 C and 25° C.). However, it has been shown that genetic information within a biological material is better preserved at lower temperatures. In other words, for the same preservation quality (genetic information integrity), a biological material may be preserved longer at lower temperature.

Therefore, depending on the time the biological is to be preserved, it may be preserved within the preservation container at ambient temperature, or at a lower temperature.

Preferably however, it is preserved at low temperature, such as −50° C. or less, for instance between −70° C. and −200° C., such as −80° C. or −196° C.

Consequently, the preservation container advantageously further comprises a cryogenic container comprising a cold source and a chamber containing the biological container, said biological container being cooled by the cold source, and step c) further comprises cooling the biological material prior to or when placing the confinement container in the biological container. Cell cooling protocols (to reach these storing temperatures without damaging the cells or the biological information contained therein) are known in the art, and usually comprise decreasing the temperature of 1° C. per minute.

In this embodiment, the cold source is preferably as described above in connection with the preservation container, which is a cryostat as defined above.

In this embodiment, the biological container is typically frozen by placing it within or in freezing proximity to the cold source. The cold source may be a cryogenic fluid or a heat engine. When the cold source is a cryogenic fluid, the biological container may be located within or above (however in freezing proximity with) the cryogenic fluid. The cryogenic fluid is typically liquid nitrogen or argon, preferably liquid nitrogen.

2.5. Biological Material

The biological material may be for instance:
a peptide, a protein, DNA or RNA,
a stem cell, in particular as defined above,
an embryo, a gamete, or a zygote, advantageously from a mammal, preferably from a mammal such as a human,
a differentiated cell,
a seed, a spore, or a pollen,
a larvae, an insect, a bacterium, a virus,
a tissue, an organ, body parts or a whole (dead) body, advantageously from a mammal, preferably from a mammal such as a human.

Advantageously, the biological material is not an embryo or a zygote.

Preferably the stem cell is an induced stem cell—such as an induced pluripotent or totipotent stem cell—or a pluripotent stem cell, more preferably an induced pluripotent stem cell or a pluripotent stem cell.

Preferably, the biological material is selected from:
a peptide, a protein, DNA or RNA,
a pluripotent stem cell, an induced (totipotent or pluripotent) stem cell, or a gamete, advantageously from a mammal, preferably from a mammal such as a human,
a differentiated cell,
a seed, a spore, or a pollen,
a larvae, an insect, a bacterium, a virus,
a tissue, an organ, body parts or a whole (dead) body, advantageously from a mammal, preferably from a mammal such as a human.

In a first embodiment, the biological material is useful as data-storage material (Jonathan PL Cox 2001, Nozomu Yachie et al. 2007). In this embodiment, the biological material can be a nucleic acid molecule, such as DNA or RNA, an amino acid molecule, such as a peptide or a protein, a virus, a bacterium or a cell, such as eukaryotic cell, or a combination thereof. In this embodiment, the biological material is preferably DNA, RNA, a peptide, a protein, a virus or a bacterium, more preferably DNA or RNA, more preferably (single or double stranded) DNA.

In a second particular embodiment, the biological material is a non-living biological material such as DNA, RNA, a peptide or a protein (such as an enzyme), preferably DNA (Jonathan PL Cox 2001).

In a third particular embodiment, the biological material is a living biological material (Nozomu Yachie et al. 2007) such as:
a stem cell, an embryo, a gamete, or a zygote,
a seed, a spore, or a pollen,
a larvae, an insect, a bacterium,
a tissue, an organ, body parts or a whole (dead) animal body.

According to a variant, the biological material is a stem cell, an embryo, a gamete, or a zygote, preferably from an animal, preferably a mammal, such as a human. Preferably, the biological material is a pluripotent stem cell, an induced pluripotent stem cell, an induced totipotent stem cell, or a gamete.

According to another variant, the biological material is a tissue, an organ, body parts or a whole body of an animal such as a mammal, preferably a human.

2.6. Preferred Combinations

Any embodiment of the preservation container may be used in the method of the invention.

Every combination of particular and preferred embodiments of the method are encompassed by the invention.

In particular, the preservation container is a cryostat. In this preferred embodiment, the room of step d) is located under 1 to 5000 mwe (such as under 3000 mwe), and the material attenuating cosmic rays is advantageously earth, rock, water and/or concrete. Also, in this embodiment, the biological material is preserved at low temperature as described above in 2.4.

In this embodiment,
a fluid with a radioactivity of less than 1 Bq/m$^3$ stands and/or circulates around and/or within the biological container and in the cryogenic container, and/or
the room contains a radon-free atmosphere of less than 1 Bq/m$^3$, the fluid and the atmosphere being radon-free air, gaseous nitrogen or gaseous argon.

Preferably, in this embodiment, the biological container is in contact with the cold source through a thermic transfer device, such as a metallic line, which allows keeping the biological container at low temperature. In the latter case, the biological container is not necessarily above the cryogenic fluid, and the cryogenic fluid may be kept in a reservoir connected to the preservation container, the reservoir not being part of the preservation container.

(a) Average number of foci counted by γ-H2A.X immunostainings in Increased, Standard and Deep underground cryopreserved hematopoietic stem cells assessed 2, 5, 7 months post cryopreservation corresponding to 5.4, 12.6, 18.3 years of storage in the Increased group. (b) Percentage of cells with at least one foci in Increased, Standard and Deep underground cryopreserved hematopoietic stem cells. (c) Average number of foci counted by γ-H2A.X immunostainings in Increased, Standard and Deep underground cryopreserved mesenchymal stem cells assessed 2, 5, 7 months post cryopreservation corresponding to 5.4, 12.6, 18.3 years of storage in the Increased group. (d) Percentage of cells with at least one foci in Increased, Standard and Deep underground cryopreserved mesenchymal stem cells. p values indicated on figures are <0.05 (*), <0.01 (), <0.001 (*), <0.0001 (****). Figures display average values of all cells tested (n=300 cells counted)±SD.

Figure 6:
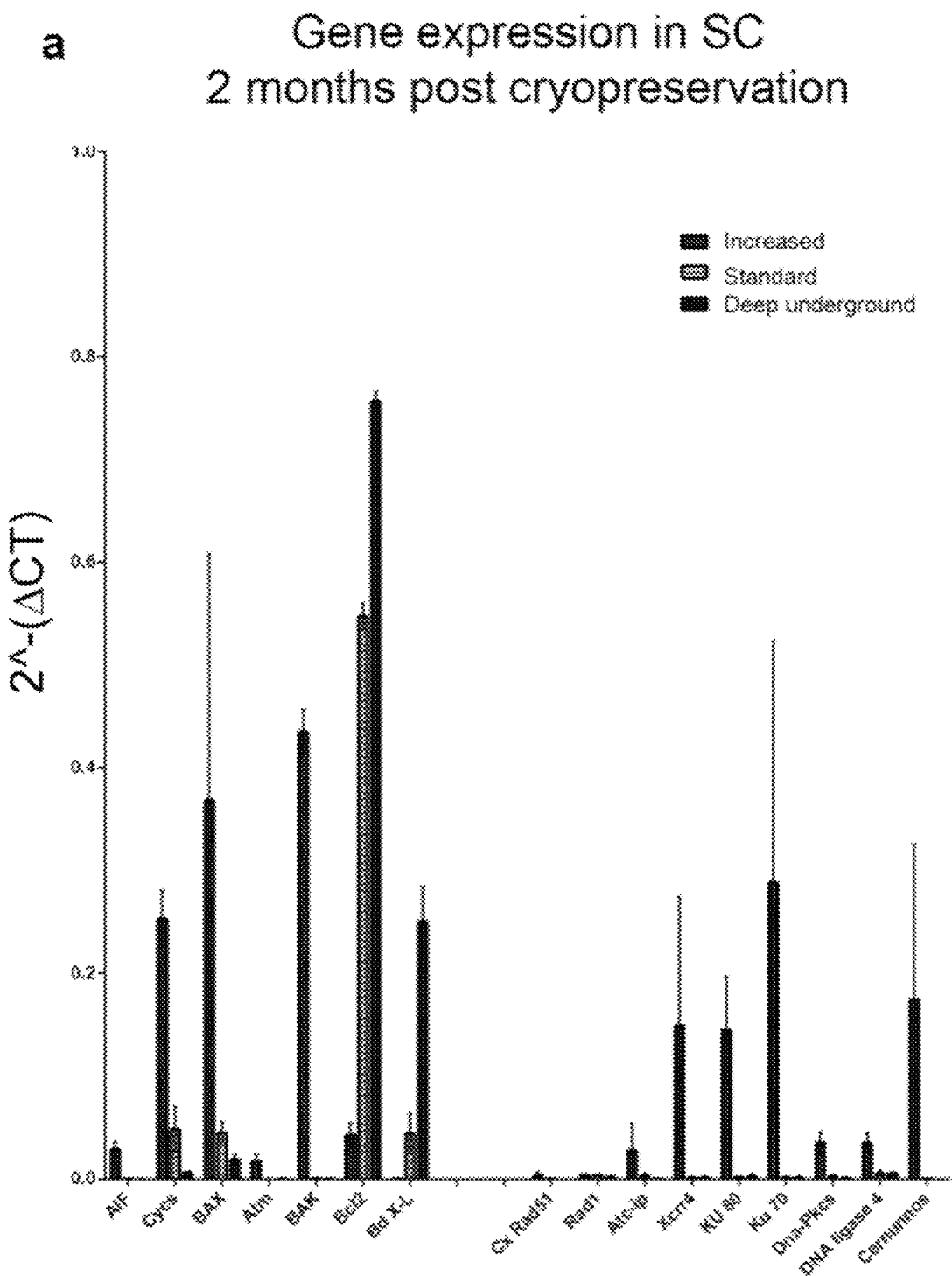

FIG. 6: Stem cells 2 months post cryopreservation in Deep underground condition express lower levels of pro apoptotic and DNA repair genes.

(a) RT-qPCR on FACS cell sorted muscle stem cells after 2 months of cryopreservation in Increased, Standard and Deep underground conditions. (b) RT-qPCR on FACS cell sorted hematopoietic stem cells after 2 months of cryopreservation in Increased, Standard and Deep underground conditions. (c) RT-qPCR on FACS cell sorted mesenchymal stem cells after 2 months of cryopreservation in Increased, Standard and Deep underground conditions. p values indicated on figures are <0.05 (*), <0.01 (), <0.001 (*), <0.0001 (****). Figures display average values of all cells tested (n=300 cells counted)±SEM.

Figure 7:
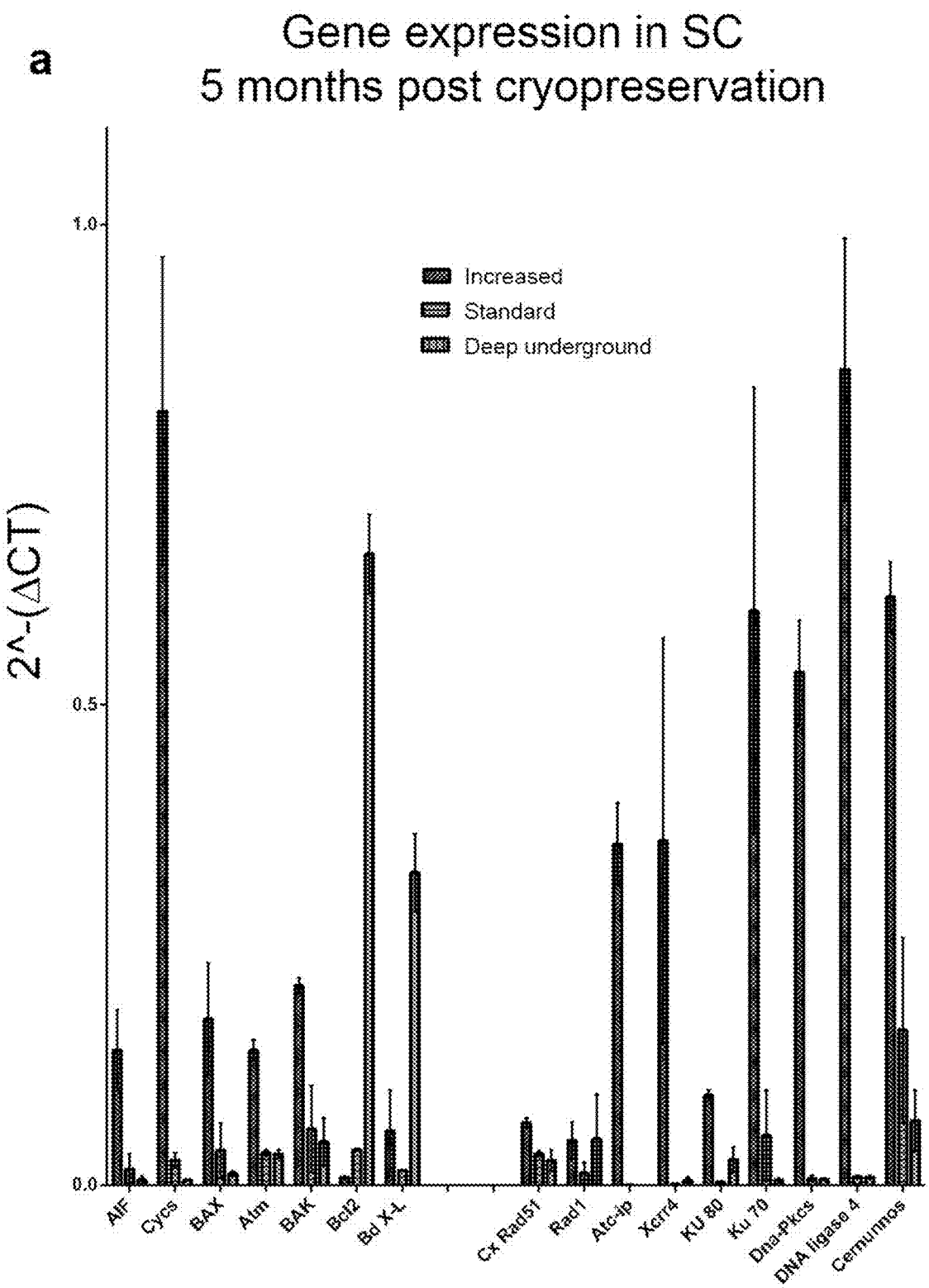

FIG. 7: Stem cells 5 months post cryopreservation in Deep underground condition express lower levels of pro apoptotic and DNA repair genes.

(a) RT-qPCR on FACS cell sorted muscle stem cells after 5 months of cryopreservation in Increased, Standard and Deep underground conditions. (b) RT-qPCR on FACS cell sorted hematopoietic stem cells after 5 months of cryopreservation in Increased, Standard and Deep underground conditions. (c) RT-qPCR on FACS cell sorted mesenchymal stem cells after 5 months of cryopreservation in Increased, Standard and Deep underground conditions. p values indicated on figures are <0.05 (*), <0.01 (), <0.001 (*), <0.0001 (****). Figures display average values of all cells tested (n=300 cells counted)±SEM.

Figure 8:
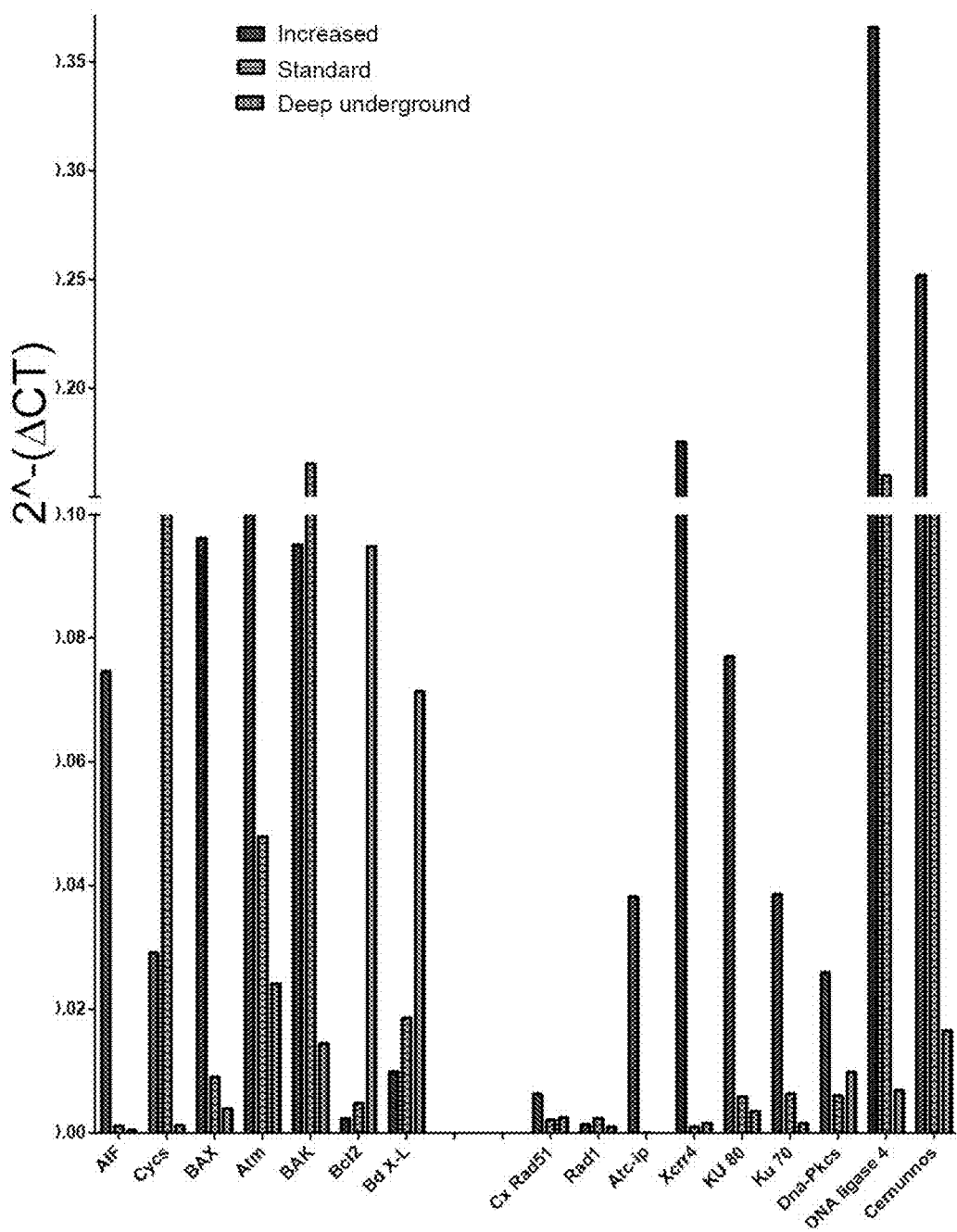

FIG. 8: After 7 months cryopreservation, cells Deep underground from cosmic rays display better survival and mitochondrial state (a) RT-qPCR on FACS cell sorted hematopoietic stem cells after 7 months of cryopreservation in Increased, Standard and Deep underground conditions. (b) RT-qPCR on FACS cell sorted mesenchymal stem cells after 7 months of cryopreservation in Increased, Standard and Deep underground conditions. (c) Annexin V staining (apoptotic cells) analysed by cytometry in Increased, Standard and Deep underground conditions on muscle stem cells 7 months post cryopreservation. (d) TMRE staining (mitochondrial membrane potential) analysed by cytometry in Increased, Standard and Deep underground conditions on muscle stem cells 7 months post cryopreservation. (e) Mitotracker staining (mitochondrial mass) analysed by cytometry in Increased, Standard and Deep underground conditions on muscle stem cells 7 months post cryopreservation. p values indicated on figures are <0.05 (*), <0.01 (), <0.001 (*), <0.0001 (****). Figures display average values of all cells tested (n=300 cells counted)±SD; ±SEM for RT-qPCR.

Figure 9:
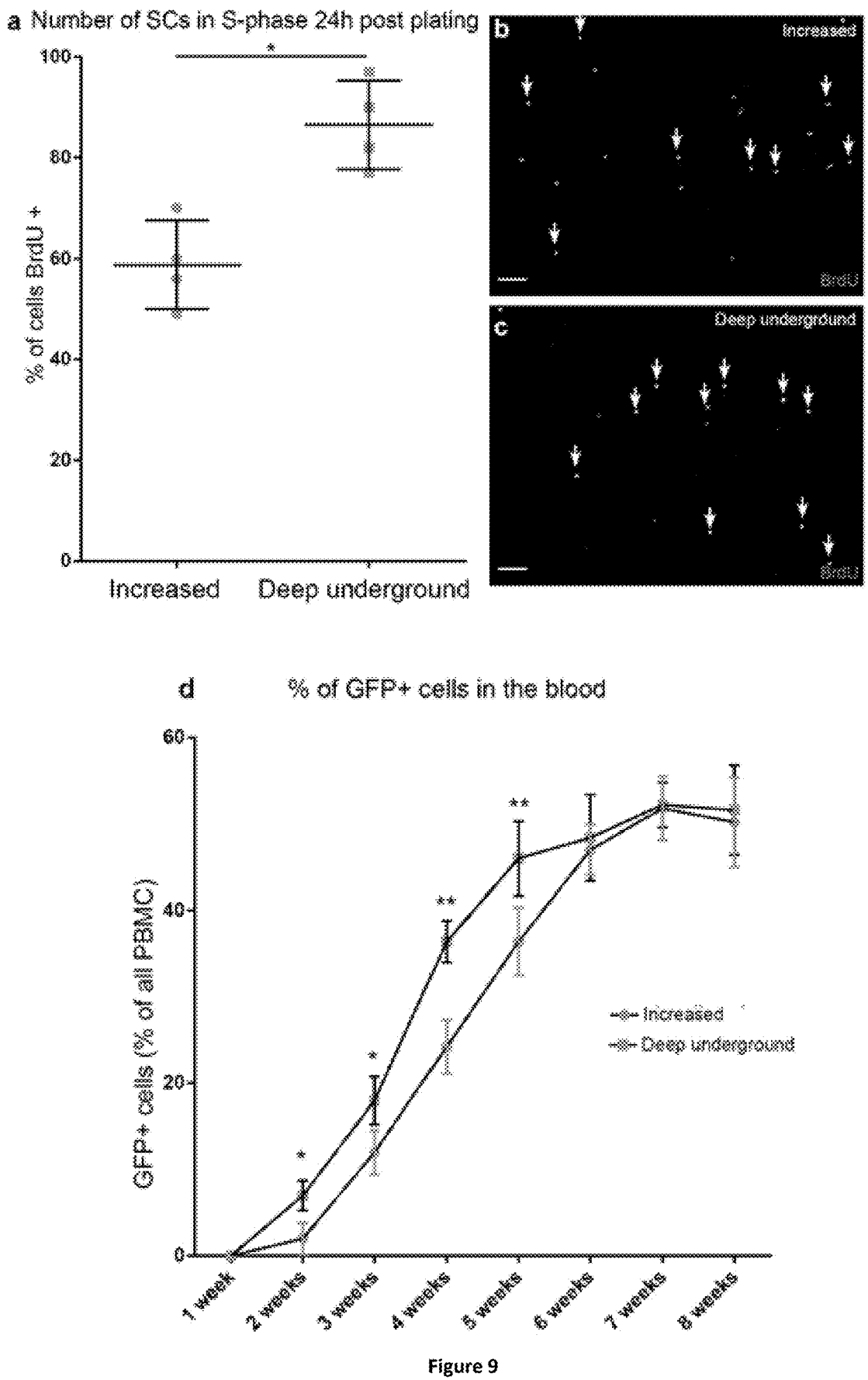
Figure 10A:
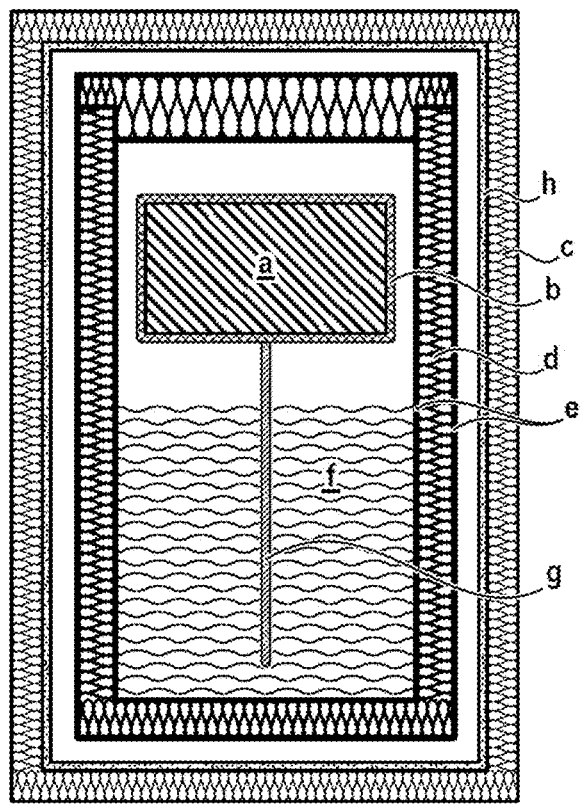
Figure 10B:
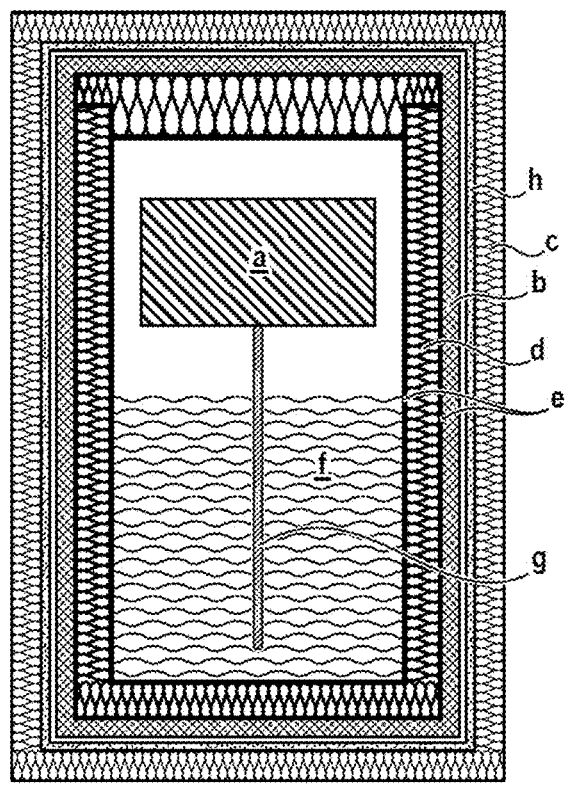
Figure 10C:
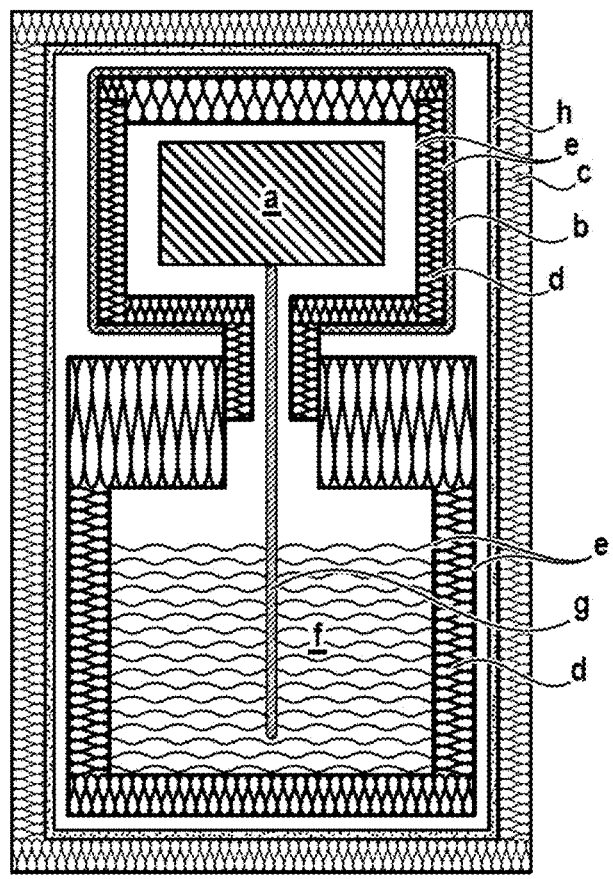
Figure 10D:
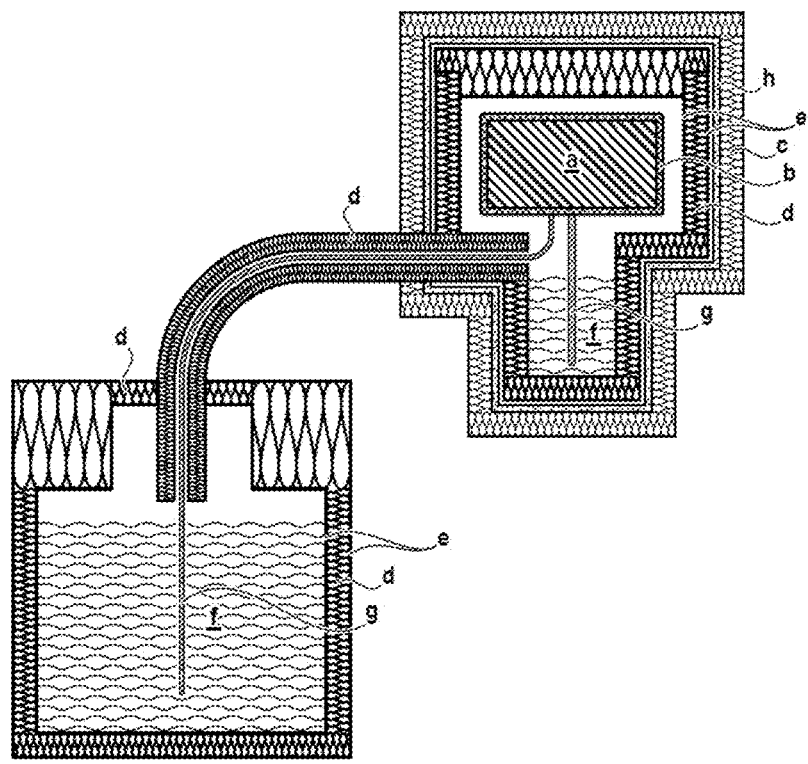
Figure 10E:
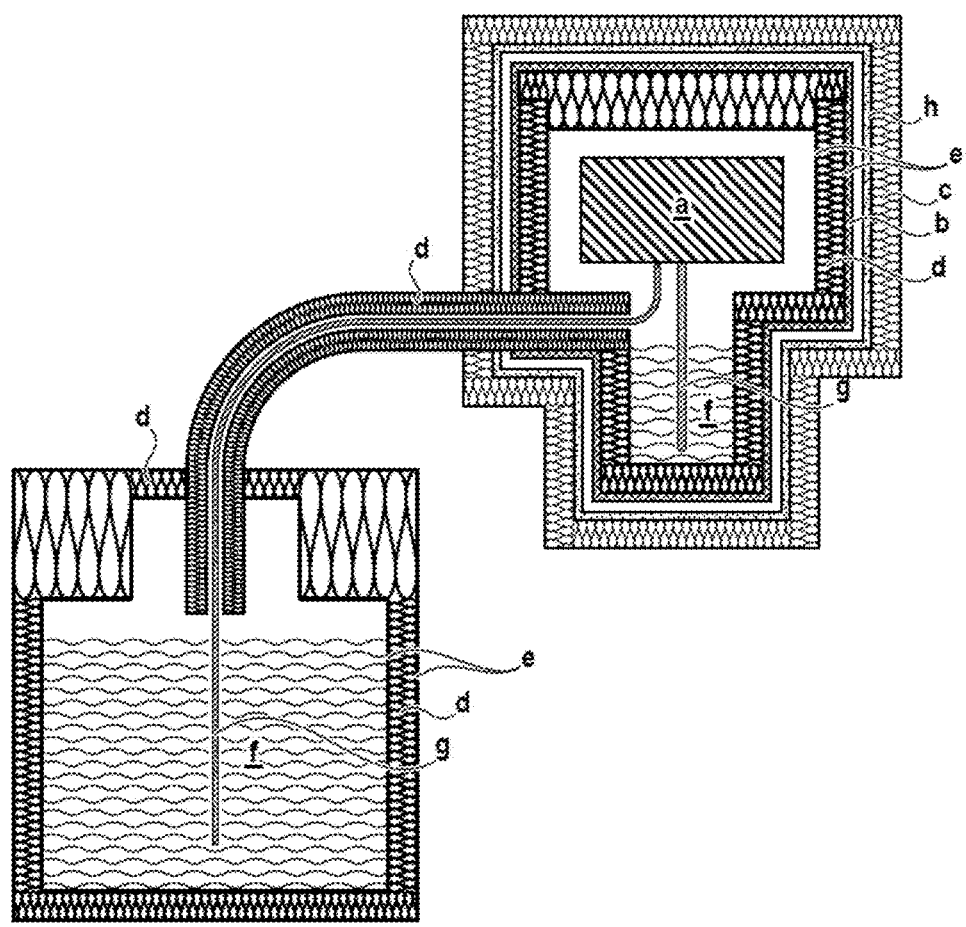

FIG. 9: hematopoietic stem cells cryopreserved in cosmic rays and irradiation free environment are differentiating faster (a) Percentage of hematopoietic stem cells BrdU+ 24 hours post plating (number of HSC entering S-phase) in Increased and Deep underground conditions. (b-c) Immunostainings with BrdU antibody on irradiated (b) and protected (c) 7 months cryopreserved hematopoietic stem cells.

(d) Percentage of white blood cells GFP+ in the blood of Rag2-/-γC-/- immunocompromised mice. Mice were injected with cryopreserved (Increased and Deep underground) hematopoietic stem cells and blood was sampled every week and analysed by cytometry. The percentage is relative to the total white blood cells in the blood. (e) Percentage of GFP+ cells among all cell in the bone marrow of Rag2-/-γC-/- immunocompromised mice 8 weeks post transplantation. p values indicated on figures are <0.05 (*), <0.01 (), <0.001 (*), <0.0001 (****). Figures display average values of all cells tested±SD scale bar 100 µm.

FIG. 10: schemes representing 5 embodiments of the preservation container of the invention a: biological container; b: first shield for gamma-rays, for instance 150 mm low-background radioactivity copper (equivalent to 10 cm of lead); c: second shield, for neutrons, for instance 30 cm of polyethylene; d: thermal insulation, for instance a superinsulator (under vacuum to increase thermal insulation), or polystyrene; e: low-background radioactivity steel (preservation container); f: cold source (here a cryogenic liquid such as liquid nitrogen); g: metallic thermic transfer line; h: Cryogenic container (for instance a low radioactivity background container filled with a radon-free gas, such as radon-free nitrogen).

Configuration A: the first shield surrounds the biological container and is located within the second shield, the biological container surrounded by the first shield is immersed within the cryogenic liquid. The cryogenic chamber is cooled thanks to a metallic thermic transfer line, which is immersed within the cryogenic liquid reservoir.

Configuration B: the first shield surrounds the cryogenic container (for instance a Dewar) containing the biological container and the cryogenic liquid and is located within the second shield, the biological container is immersed within the cryogenic liquid. The cryogenic chamber is cooled thanks to a metallic thermic transfer line, which is immersed within the cryogenic liquid reservoir.

Configuration C: The biological container is located in a cryogenic container. The cryogenic container defines a chamber for storing the biological container, and a chamber for containing the cold source, here a cryogenic fluid. The biological container is cooled thanks to a metallic thermic transfer line, which is immersed within the cryogenic liquid (i.e. going from one chamber to the other in the cryogenic container). The first shield surrounds only the chamber containing the biological container, while the second shield surrounds the whole of the cryogenic container, including the first shield.

Configuration D: the first shield surrounds the biological container and is located within the cryogenic container. The cryogenic chamber is an "alarm chamber", connected to a regular cryostat, used as a cryogenic liquid reservoir. The cryogenic is cooled thanks to a metallic thermic transfer line, which is immersed within the cryogenic liquid reservoir. If the thermic transfer with the reservoir is faulty, then the "alarm" cryogenic chamber takes over so that the biological container is still kept at low temperature. The cryogenic liquid reservoir is not necessary aligned with the biological container.

Configuration E: the first shield surrounds cryogenic chamber containing the biological container (and thermal insulator) and is located within the second shield. The cryogenic chamber is cooled thanks to a metallic thermic transfer line, which is immersed within the cryogenic liquid reservoir. If the thermic transfer with the reservoir is faulty, then the "alarm" cryogenic chamber takes over so that the biological container is still kept at low temperature. The cryogenic liquid reservoir is not necessary aligned with the biological container.

Figure 11:
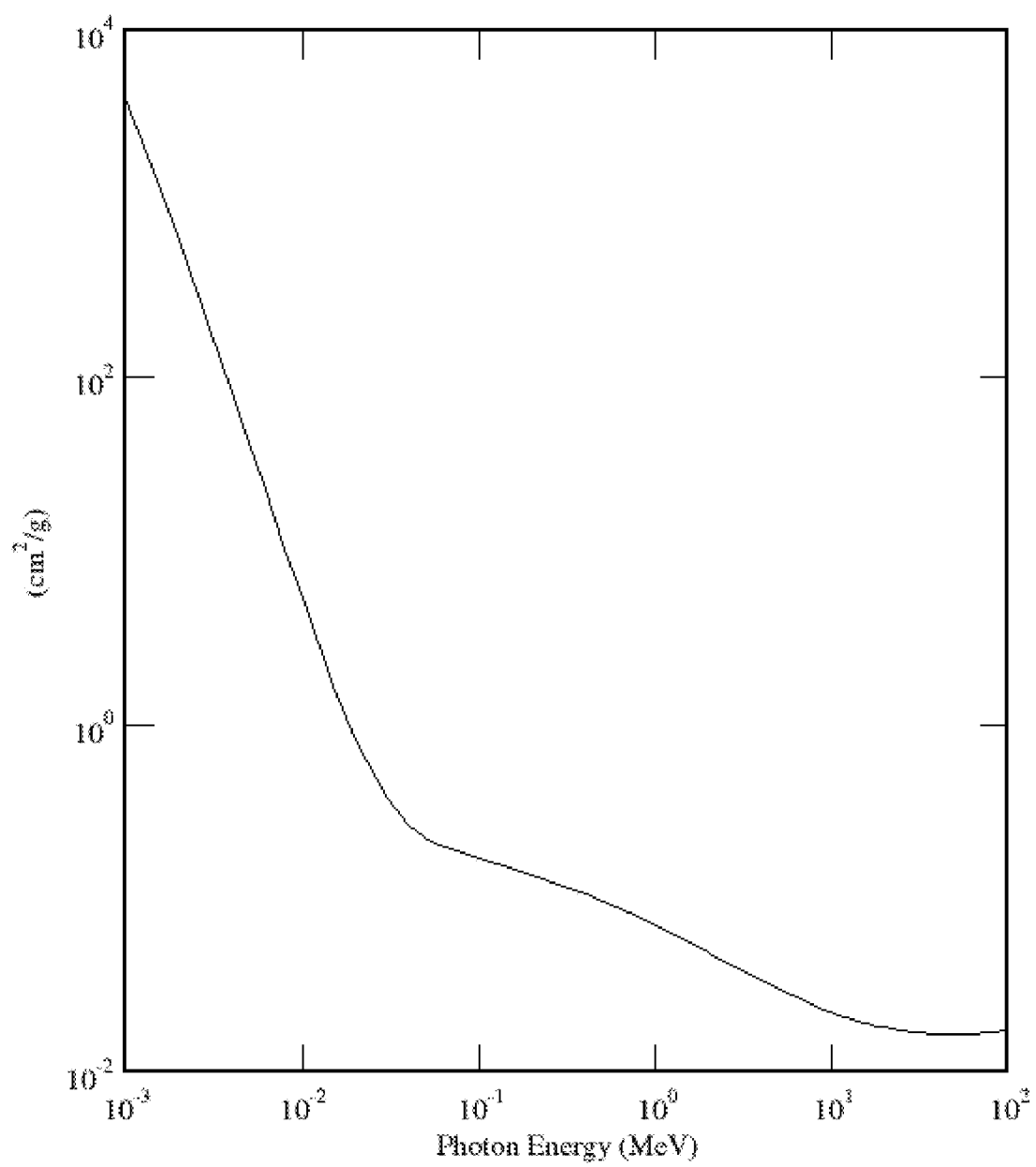

FIG. 11: Total attenuation coefficient standards for gamma-rays—Water (source: NIST, National Institute of Standards and Technology: https://www.nist.gov/pml/xcom-photon-cross-sections-database).

Figure 12:
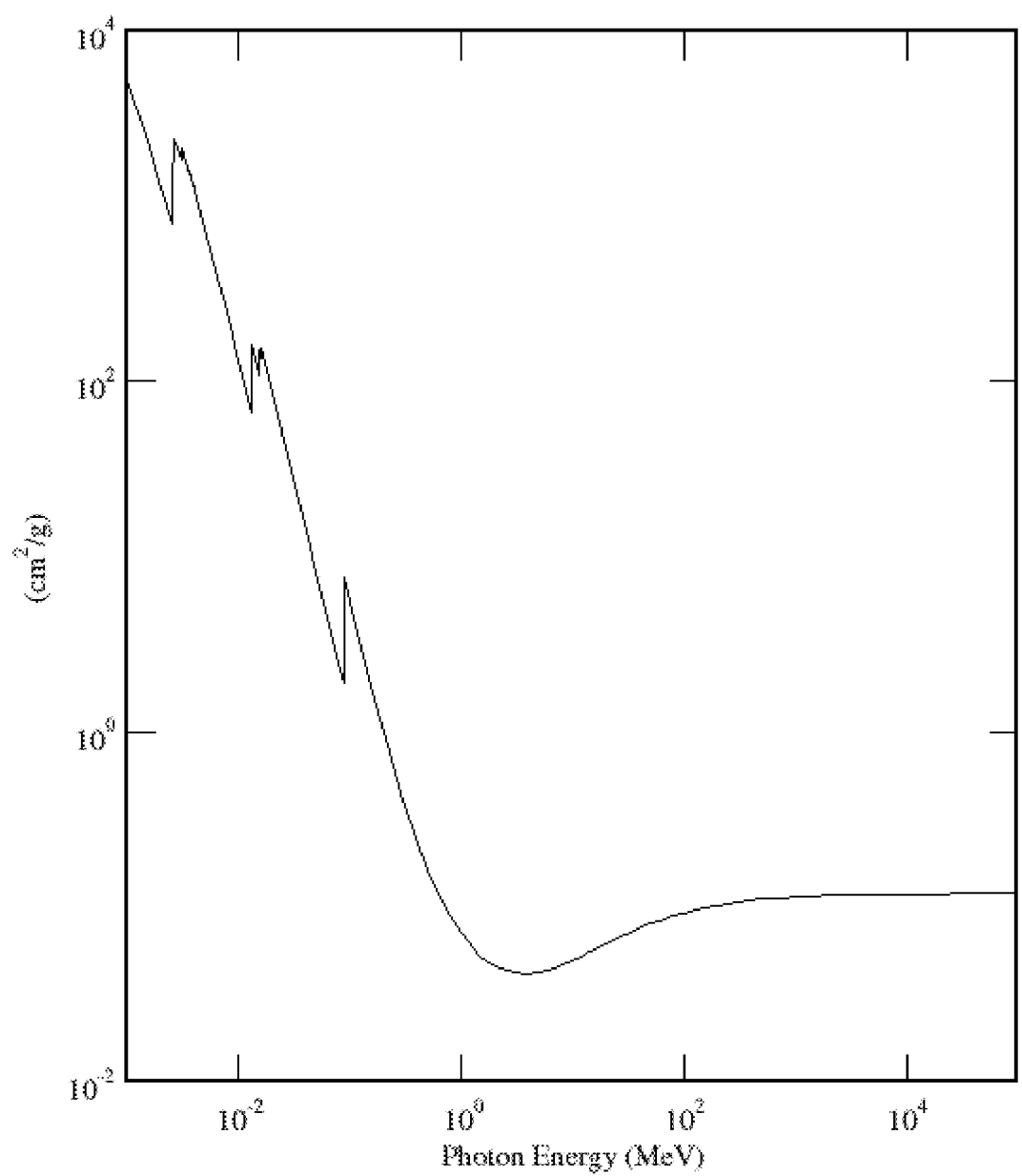

FIG. 12: Total attenuation coefficient standards for gamma-rays—Lead (source: NIST, National Institute of Standards and Technology: https://www.nist.gov/pml/xcom-photon-cross-sections-database). Total attenuation in $g \cdot cm^{-2}$ with coherent scattering (for photons).

Figure 13:
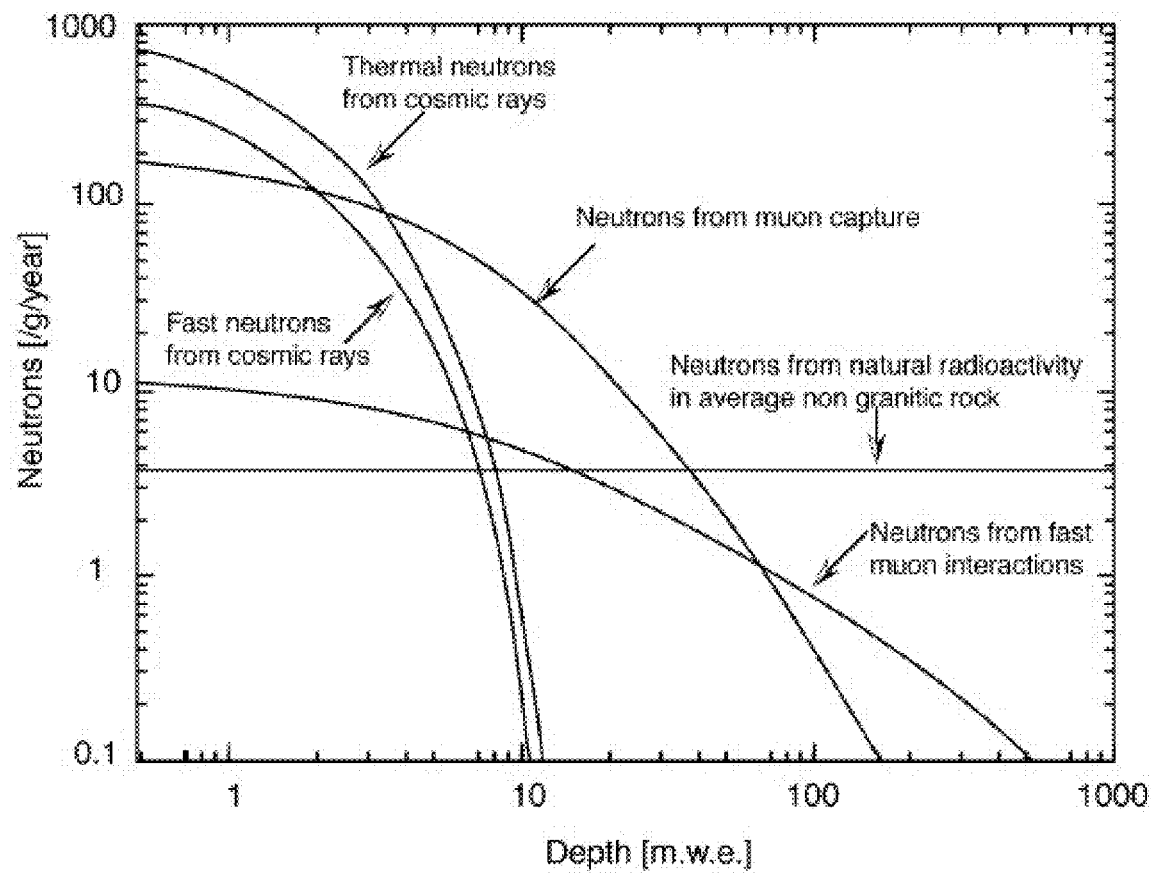

FIG. 13: Attenuation of fast neutrons induced by cosmic-ray interaction as a function of depth in water meter equivalent. Figure adapted from E.-I. Esch, Detector Development for Dark Matter Research, Ph.D. thesis, Justus-Liebig—Universität Giessen (2001) with data for cosmic rays from D. Lal, B. Peters Handbuch der Physik 46/2, 551 (1967). Total attenuation in $g \cdot cm^{-2}$ with coherent scattering (for photons).

EXAMPLES

The following examples are given for illustrative purposes, and should not be interpreted as limiting the scope of the invention in any way.

1. Introduction 3 different types of stem cells were used:
Muscle stem cells (satellite cells) responsible for muscle growth and repair,
Hematopoietic stem cells responsible for formation and renewal of the blood, and
Immune system and mesenchymal stem cells, which are the most widely used stem cells in clinical applications.

For these 3 types of stem cells, exposure to natural neutrons and gamma-rays from radioactivity negatively impacts cell recovery after cryopreservation. It is hereafter shown that long-term storage using the method of the invention, i.e. in an almost neutron and natural radioactivity free environment, improves cell recovery after 6-month cryopreservation.

2. Material and Methods

Experimental Design

As a reference, the radiation dose received by a human over 1 year at the earth surface (2.4 mSv) is used.

The Modane Underground Laboratory (LSM) is located in the middle of the Fréjus tunnel. The laboratory is under 1700 m of rock. This is equivalent to 4800 meters of water as a shielding against cosmic rays. Inside the LSM cavity, the muon flux is 4 cosmic-rays/m² per day. As compared to the surface ($1\times10^7$/m²/day), the cosmic ray flux is reduced by a 2.5 million factor. The neutrons flux is reduced by a 10 000 factor ($10^{-6}$ neutrons/cm².s in LSM) as compared with the surface ($10^{-2}$ neutron/cm²·s)

The LSM also has a surface facility in Modane with a cosmic-ray flux of $2\times10^7$ cosmic rays/m² per day.

The stem cells are stored in test tubes made of plastic. The stem cells were stored under 4 different exposure conditions with regard to ionizing radiations:

The "Altitude" storage conditions were designed to measure the effect of cosmic rays and natural radioactivity on different types of cell cryopreserved. Under "Altitude" conditions, the biological material was stored in cryotube and was exposed to standard cosmic ray and natural radioactivity flux at the LSM building in Modane city, corresponding to standard natural radioactivity at ground level with ambient neutron and gamma-ray conditions.

"Increased" conditions simulate a dose 32 times higher than natural exposure received by the stem cells. The "increased" conditions were obtained by adding ionizing radiation from natural source (2840 Bq of 232Th at secular equilibrium), specifically by exposing the cryotubes containing the biological material to a gamma-ray radioactive source. The doses were calculated and measured. The measurements of the induced doses were performed with a LiF dosimeter installed in a cryotube to have a phantom as representative as possible of the cells. Simulations performed with GEANT 3.1 simulation software are in good accordance with this measurement. The difference lies in the different geometry in the simulation, the tube is modelled by a flat bottom cylinder such as the cells pack, and for the measure the square is not fitting exactly the bottom of the tube. There is uncertainty of more than 10% on the real doses but it doesn't affect the results.

A two-month exposure under "Increased" conditions corresponds to 6 years exposure to natural ambient radioactivity.

"Standard" conditions correspond the usual storage conditions used at Institut Pasteur (Paris), wherein the biological material is stored in a common Dewar on the second basement. Taking into account the number of floors of the facility of Institut Pasteur above the surface, it is estimated that the protection against cosmic-rays is of the order of 100 cm of concrete. Which acts as a cosmic ray attenuating material. The neutron flux due to neutrons induced by muons only is estimated to $10^{-3}$ neutron/cm².s. Under "Standards" conditions, natural radioactivity is unchanged but the neutron flux from cosmic rays is reduced by a factor of 3 to 4 due to the subsurface storage.

"Deep underground" conditions correspond to storage conditions in a deep underground laboratory (−1700 m). At this depth, 99,999% of the cosmic ray flux is suppressed. The stem cells are installed in a cryostat shielded by 5 cm of archaeological lead and 10 cm standard lead corresponding to a reduction of $10^6$ of the natural gamma-ray flux. The storage is flushed with nitrogen to prevent radon to come in the vicinity of the cryotubes.

At 1700 m under Fréjus mountain, the laboratory is shielded against cosmic-rays, they are reduced by a factor 4 000 000 and then secondary induced particles (in particular induced fast neutrons) become negligible. The cells are installed in a cryostat protected against the natural radioactivity by an additional shielding made of 10 cm of low radioactivity lead and 5 cm of archaeological lead to shield from external radioactivity coming from rock. The gamma-ray flux is decreased by 6 orders of magnitude. The cells are put in a copper holder with 5 cm of copper as a shield for the hole in the shield induced by the cold finger. The cooling is monitored by pt100 thermometer. The cold is produced by the evaporation of nitrogen in a classical dewar and conducted to the cryotube by a 5 mm diameter copper rod. The evaporation of nitrogen is used to pressure a steel container preventing the radon to come in the vicinity of the cells (Scheme attached: FIG. 10, configuration C without second shield). The materials used were tested for their radioactivity gamma and are all granted low radioactivity. The materials are below the detection limits of the detector so the doses induced to the cell is lower than the background of the germanium used for material selection. The shielding is not effective to protect the cells against neutron coming from rock produced by self-fission of heavy nuclei and (α,n) reaction on light nuclei. The spectrum of neutron in the lab is different from those encountered in the previous Condition increased because cosmic rays contain neutrons ranging up to energies of GeV instead of 9 MeV maximum energies in the underground lab. The experimental setups are not suited to extract data taking into account the spectra of neutrons so only integral counting is discussed.

The main characteristics of these 4 sets of storage conditions are summarized in table 3 below.

TABLE 3

| Condition | Depth (mwe) | Doses (mSv/year) | Neutron flux (neutron/cm².s) |
|---|---|---|---|
| Standard | 10 | 2.4 | $3.10^{-3}$ |
| Increased | 0 | 76.65 | $10^{-2}$ |
| Altitude | 0 | 2.4 | $10^{-2}$ |
| Deep Underground | 4800 | $<2.7\ 10^{-6}$ | $3.10^{-6}$ |

Mice Injection Injury and Graft

All protocols were reviewed by the Institut Pasteur, the competent authority, for compliance with the French and European regulations on Animal Welfare and with Public Health Service recommendations. This project has been reviewed and approved (#CETEA 2015-0039) by the Institut Pasteur ethic committee (C2EA 89-CETEA). Unless specified 6 to 8 weeks old male mice were used in this study and housed on a 12:12 light/dark cycle in a pathogen free facility with controlled temperature and humidity. Food and drink were given ad libitum. For isolation of mesenchymal and hematopoietic stem cells bone marrow from either C57131/6 from Charles River or Tg:Actin-GFP mice were used. For isolation of muscle satellite cells Tg:Pax7-nGFP mice were used. Rag2−/−γC−/− immunocompromised mice were used for transplantation experiment as host. When grafting muscle stem cells mice were anesthetized with ketamine (Imalgene1000 100 mg/Kg Merial) and Xylazine (Rompun2% 20 mg/Kg Bayer) prior to surgery, injected 18 h before the transplantation with notexin 10 μl of 12.5 μg/ml (Latoxan) in the tibialis anterior. 10.000 muscle stem cells in 10 ∝l of 0.9% NaCl were grafted. For grafting hematopoietic stem cells Rag2−/−γC−/− immunocompromised mice were irradiated at 95cGy and transplanted 3 hours later intravenous (retro-orbital) with 20 ∝l of cells in suspension in 0.9% NaCl.

Muscle Cell Sorting, Count and Culture

Muscle dissection was done by removing all of the limb muscle from the mice, in cold DMEM. Muscles were then chopped with small scissors and put in a 50 ml Falcon® tube with collagenase 0.1% and trypsin 0.1% at 37° C. with gentle agitation. After 20 min, the supernatant was collected in 2% serum placed on ice, and the collagenase/trypsin solution was added to continue the digestion. Once muscle is completely digested, the solution was filtrated using 40 µm cell strainers. Satellite cells were cultured in 1:1 DMEM-Glutamax (Gibco #41965-039):MCDB201 (Sigma #M6770) containing 20% serum FBS (Biowest S1860). Cells were plated on Matrigel coating (BD Biosciences #354234) and kept in an incubator (37° C., 5% CO2) at an initial concentration of 2,000 cells per mm2. For satellite cell counting after grafting, only the Tibialis anterior muscle was dissected and digested as described earlier, and the totality of the tube was analysed to assess the number of satellite cells per muscle. FACS analyses were done using a FACSaria (Beckman). Analyses and quantitation were performed using Summit v4.3 software from DakoCytomation and FloJo software. Cells were labelled with propidium Iodide 10 µg/ml (Sigma-Aldrich #P4170) to exclude dead cells and displayed using the PE (Phycoerythrin, Red) channel on the FACS profile.

Isolation and Culture of Mesenchymal Stem Cells and Hematopoietic Stem Cells

MSC were harvested, cultured and characterized from C57BL/6J mice, as previously reported. Briefly, in anesthetized mice (injected intraperitoneally with 100 mg per kg body weight of ketamine and 5 mg per kg body weight of xylazine), femurs were flushed to recover bone marrow. For mesenchymal stem cells isolation, the cell suspension was filtered before red blood cell lysis and incubated with the following antibodies: allophycocyanin (APC)-conjugated PDGFR-α, FITC-conjugated Sca-1, phycoerythrin (PE)-conjugated CD45, and Ter119. Appropriate gates were constructed on a cell sorter to exclude dead cells and lineage (CD45(+)Ter-119(+))-positive cells. Cells were plated in tissue culture flasks, and cultured in 1 ml of complete medium at a density of 25×106 cells ml−1. Cells were incubated in plates at 37° C. with 5% CO2 in a humidified chamber. After 3 h, the supernatant was removed and non-adherent cells that accumulate on the surface of the dish were replaced by changing the medium. After an additional 8 h of culture, the medium was replaced with 1.5 ml of fresh complete medium. From this time cell were detached with light (0.01%) trypsin and washed to start the cryopreservation. For hematopoietic stem cells the same samples from flushed bone marrow were used but another set of antibodies used. To isolate HSC we used CD34low/−, SCA-1+, CD90/Thy1+/low, CD38+, c-Kit+, and Lin−. Appropriate gates were constructed on a cell sorter to exclude dead cells. Cells were washed and directly cryopreserved without any plating.

Live Video Microscopy

Cells isolated by FACS and cryopreserved were plated overnight on a 24-well glass bottom plate (P24G-0-10-F; MatTek) coated with matrigel (BD Biosciences #354234) and placed in an incubator in pre-equilibrated medium (1:1 DMEM Glutamax: MCDB [Sigma-Aldrich], 20% Fetal Calf Serum (FCS) (Biowest S1860)). The plate was then incubated at 37° C., 5% CO2 (Zeiss, Pecon). A Zeiss Observer.Z1 connected with a LCI PInN 10x/0.8 W phaseII objective and AxioCam camera piloted with AxioVision was used. Cells were filmed for up to 6 days, and images were taken every 30 min with brightfield and phase filters and MozaiX 3×3 (Zeiss). Raw data were transformed and presented as a video.

Immunostaining

Immunostaining was performed either on cryosections fixed with 4% paraformaldehyde (PFA EMS #15710) in cold PBS, permeabilized with 0.5% Triton X-100 20 min at room temperature, washed, and blocked with 10% BSA for 30 min; or on cells fixed with 4% paraformaldehyde (PFA EMS #15710) in cold PBS, permeabilized with 0.5% Triton X-100 with BSA 3% 20 min at room temperature. Sections or cells were incubated with primary antibodies overnight at 4° C. (Pax7 monoclonal DSHB; Myogenin clone F5D abcam ab1835; BrdU clone B44 BD Biosciences; γ-H2A.X clone JBw1 Merk05-636) and with Alexa-conjugated secondary antibodies 1/300 and Hoechst for 45 min. Sections were then analysed using an automated axioscan (Zeiss) or inverted Observer.Z1 Apotome (Zeiss). For BrdU immunostaining specifically cells were fixed with 4% paraformaldehyde, washed and unmasked with 2N HCl for 20 minutes at room temperature, neutralised with 0.1M borate and then processed as described for other primaries antibodies.

Image Analysis

For image analysis, the ImageJ 1.46r software was used. For counting the number of PLAP+ fibres and quantifying Pax7 and Myogenin expression the cells were counted in double blind. For videomicroscopy analysis "manual tracking was done" and single cells were manually followed to assess cell division and velocity.

Mitochondrial Membrane Potential and MitoTracker Deep Red and ROS Assays

Mitochondrial membrane potential was measured after cryopreservation. 200 nM Tetramethylrhodamine ethylamine (TMRE, Sigma-Aldrich) was 30 minutes at 37° C. Cells were also incubated for 30 min with the MitoTracker Deep Red staining (FM 8778S from Cell Signalling), a dye that stains mitochondria in live cells. ROS were measured by incubating CellRox (life technologies #C10422) 30 min at 37° C. Cells were analysed by cytometry.

RT-qPCR

Total RNA was isolated from cells using the RNAeasy Micro kit (Qiagen), and reverse-transcribed using Superscript II Reverse transcriptase (Invitrogen). Real-time quantitative PCR (RT-qPCR) was performed using Power Sybr Green PCR Master Mix (Applied Biosystems) and the rate of dye incorporation was monitored using the StepOne™ Plus RealTime PCR system (Applied Biosystems). Three biological replicates were used for each condition. Data were analyzed by StepOne Plus RT PCR software v2.1 and Microsoft excel. TBP transcript levels were used for normalisation of each target (=ΔCT). Real-time PCR CT values were analyzed using the 2-(DDCt) method to calculate the fold expression.

Statistical Analysis

Statistical analysis was performed using GraphPad Prism software using appropriate tests (non-parametric Mann-Whitney or two-way anova unless specified) and a minimum of 95% confidence interval for significance; P values indicated on figures are <0.05 (*), <0.01 (), and <0.001 (*). Figures display average values of all animals tested±s.d, or ±s.e.m. for RT-qPCR, or as specifically indicated for the other experiments.

3. Results

Figure 1:
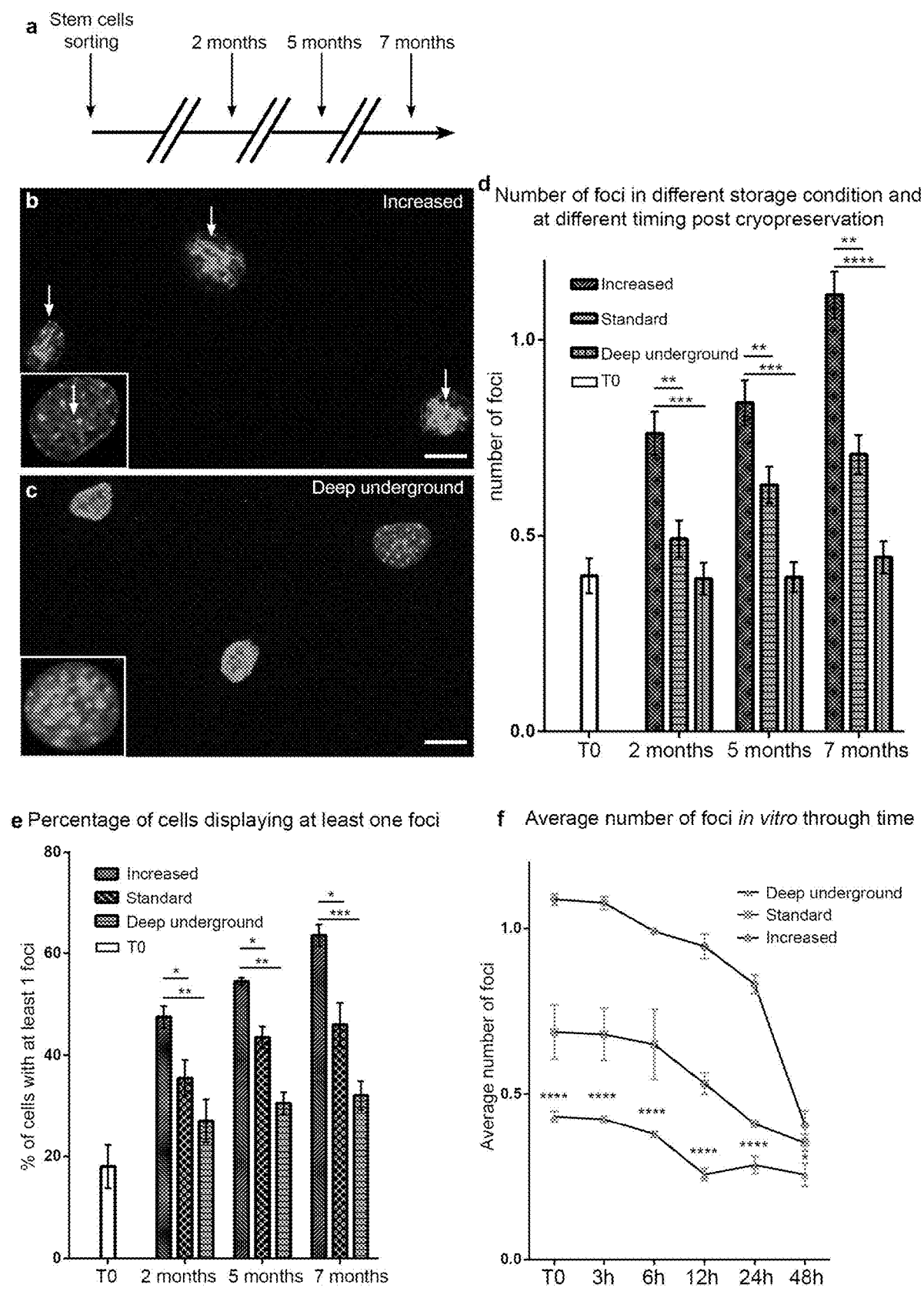
FIG. 1: Long term cryopreservation creates double strand breaks in stem cells (a) Schematic representation of the experimental design and stem cells extraction. (b-c) γ-H2A.X immunostaining of Pax7nGFP cells sorted, cryopreserved 7 months in Increased (b) and Deep underground (c). (d) Average number of foci in Increased, Standard and Deep underground cryopreserved muscle stem cells 2, 5 and 7 months post cryopreservation, corresponding to 5.4, 12.6, 18.3 years of cryopreservation in the Increased group. (e) Percentage of cells with at least one foci in Increased, Standard and Deep underground cryopreserved muscle stem cells. (f) After sorting and cryopreserving the cells 7 months, cells were plated and cultured for 2 days in the Increased, Standard and Deep underground muscle stem cells. Cells were fixed right after plating, 3 h, 6 h, 12 h, 24 h, and 48 h post plating and immunostained with γ-H2A.X. p values indicated on figures are <0.05 (*), <0.01 (), <0.001 (*), <0.0001 (****). Figures display average values of all cells tested (n=300 cells counted)±SD. Scale bar is 10 μm.

In order to assess the long term effect of cell exposure to natural ionising radiations (cosmic rays and natural radioactivity) when cryopreserved, muscle stem satellite cells (SCs) were isolated from Tg:Pax7nGFP transgenic mouse[1, 2]. SCs were stored in the 4 conditions described above. The cells were harvested at 2, 5, 7 months post cryopreservation. We assessed the number of DNA double strand break (DSB) as they are considered to be the most relevant lesion for the deleterious effects of radiations[3,4] (FIG. 1a). An increase of the average number of DSB measured with γ-H2A.X immunostaining[5] was observed in the cryopreserved cells stored under "Standard" conditions as well as under "Surface" conditions, in all time points investigated (FIG. 1a-d). Interestingly the SCs kept under "Deep underground" conditions displayed no statistically significant change in the number of foci observed after 7 months of cryopreservation (FIG. 1b-d). The average increase in the number of foci was due to an increase in the number of cells damaged by ionising radiation (FIG. 1e). To investigate the DSB disappearance kinetics we plated the cells after 7 months cryopreservation. We observed a persistence of DSB in with an efficient DSB repair taking place only 24 hours post-plating in the Condition Standard (FIG. 1f) confirming previous data showing a decreased capacity to repair DSB upon very low irradiation exposure.[5] The use of hematopoietic stem cells (HSCs) and mesenchymal stem cells (MSCs) are very promising and there is an extensive research on those two cell types. The previous observations on SCs was confirmed by applying the same techniques and it was shown that HSCs and MSCs display fewer foci when cryopreserved under "Deep Underground" conditions (FIG. 5a-d). A better preservation of the DNA integrity was observed upon preservation under "Deep underground" conditions when cells were preserved for extended periods of time.

Figure 2:
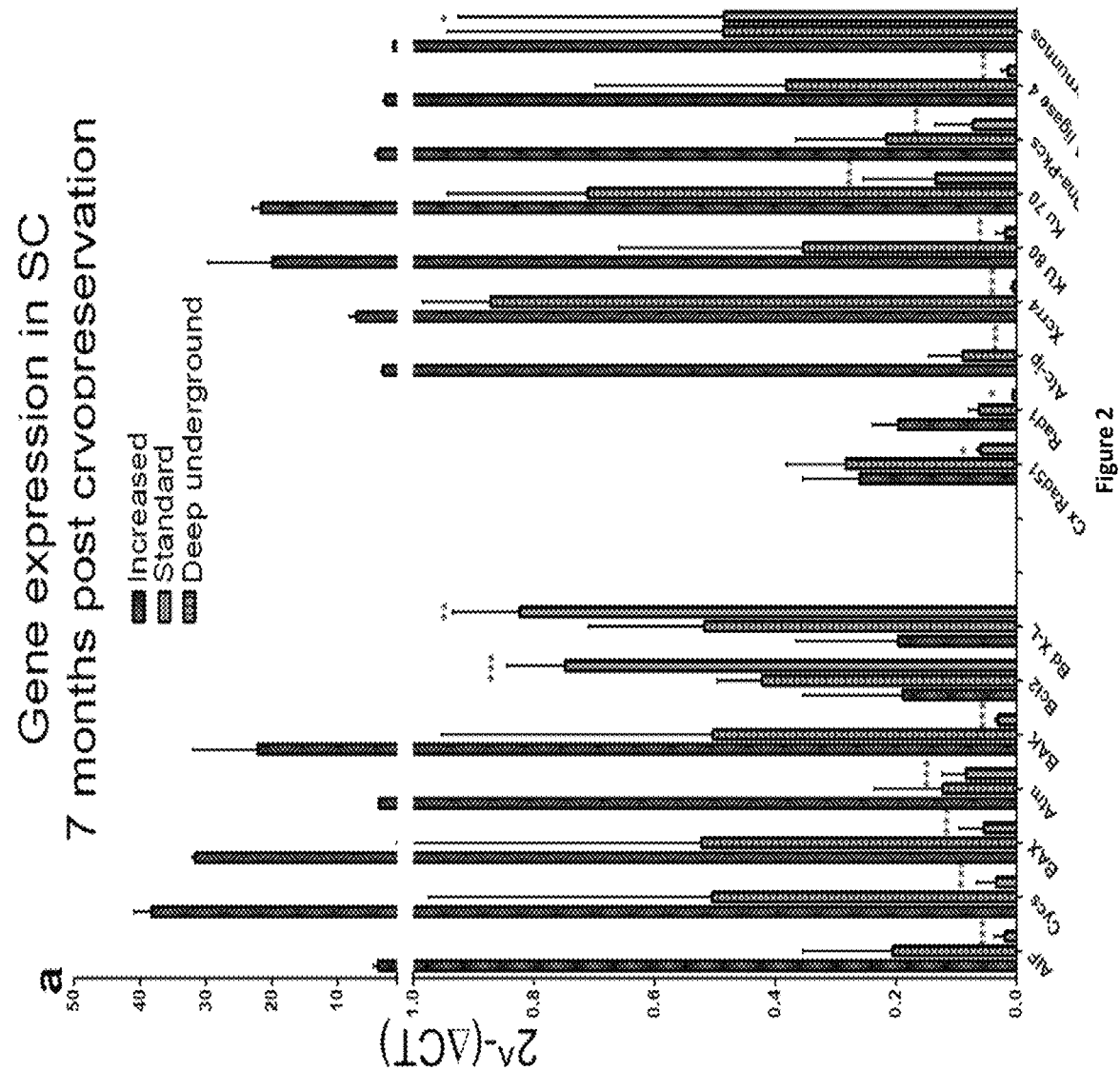
FIG. 2: Cells cryopreserved in a cosmic rays and irradiation free environment are less prone to stress and apoptosis (a) RT-qPCR on FACS cell sorted muscle stem cells after 7 months cryopreservation in Increased, Standard and Deep underground conditions. (c-e) Number of cleaved capsapse3 (apoptotic) cells after 7 months cryopreservation in Increased, Standard and Deep underground conditions. (c) Percentage of cleaved caspase3 positive cells. (d-e) immunostainings of cleaved caspase3 in Increased (d) and Deep underground (e) muscle stem cells. (f) Levels of ROS analysed by cytometry in the Increased, Standard and Deep underground 7 months cryopreserved muscle stem cells. p values indicated on figures are <0.05 (*), <0.01 (), <0.001 (*), <0.0001 (****). Figures display average values of all cells tested (n=300 cells counted)±SD or ±SEM for RT-qPCR.

Repair of radiation-induced DSBs in quiescent cells appears to occur primarily by Non-Homologous End Joining (NHEJ).[6-8] NHEJ-type repair is an error prone mechanism, which often leads to misrepaired DSBs that may result in chromosomal deletions, insertions or translocations, and subsequent genomic instability.[9] Thus, the genes responsible for NHEJ repair were identified in the three investigated lineages, and it was also investigated whether their expression is activated upon cryopreservation in the three storage conditions. Key regulators of NHEJ following irradiation include Ku70, Ku80, XRCC4, DNA-PKcs, DNA Ligase4, Cernunnos or XRCC4-like factor (XLF) and Artemis (Atc-ip)[12]. It is known that SCs transcribed NHEJ genes.[7] RT-qPCR of the DNA damage repair genes showed that after 7 months of cryopreservation, the genes involved in NHEJ DNA repair were much more expressed than when SCs were kept in a cosmic ray free environment (FIG. 2a). Homologous recombination (HR) increased after cryopreservation in irradiated group but to a much lesser extent (FIG. 2a). Those results were confirmed with a westernblot. An analysis of the anti-apoptotic (Bcl2, Bcl-xL) and pro-apoptotic (Bax, Bak) genes[11] showed marked differences in their expression under "Deep underground" conditions, "Standard" conditions and "Increased" conditions. Under the "Deep underground" cryopreservation conditions, it was observed an up regulation of anti-apoptotic genes whereas in the irradiation exposed conditions we observed an up-regulation of pro apoptotic genes (FIG. 2a). These results were already detected as soon as 2 and 5 months post cryopreservation (corresponding to 5.25 and 10.5 years of preservation) (FIG. 6a; FIG. 7a) and further confirmed in other cell types HSCs and MSCs at all time points investigated (FIG. 6b,c; FIG. 7b,c; FIG. 7b,c FIG. 8ba,b). When looking at apoptosis we observed a 25% decrease of the number of cleaved caspase 3 positive cells 7 months post cryopreservation when the SCs are preserved under «Deep Underground» conditions (FIG. 2c-e). These results were confirmed with Annexin V staining (FIG. 8c). Cell cryopreservation under «Deep Underground» conditions also resulted in less reactive oxygen species (ROS) upon thawing the cells (FIG. 2f). This is key as ROS can affect signalling pathways by directly reacting with various proteins to alter processes that regulate cell cycle progression, apoptosis, quiescence or differentiation; key features of stem cells[12-14]. Interestingly, TMRE measuring the mitochondrial membrane potential showed reverse staining 7 months post cryopreservation, also indicating the better state of SCs when kept away from radiations (FIG. 8d) and no change in the mitochondrial mass were observed as measured by mitotracker staining (FIG. 8e). The cells are less prone to enter apoptosis and have less ROS when kept under «Deep Underground» conditions for extended periods of time.

Figure 3:
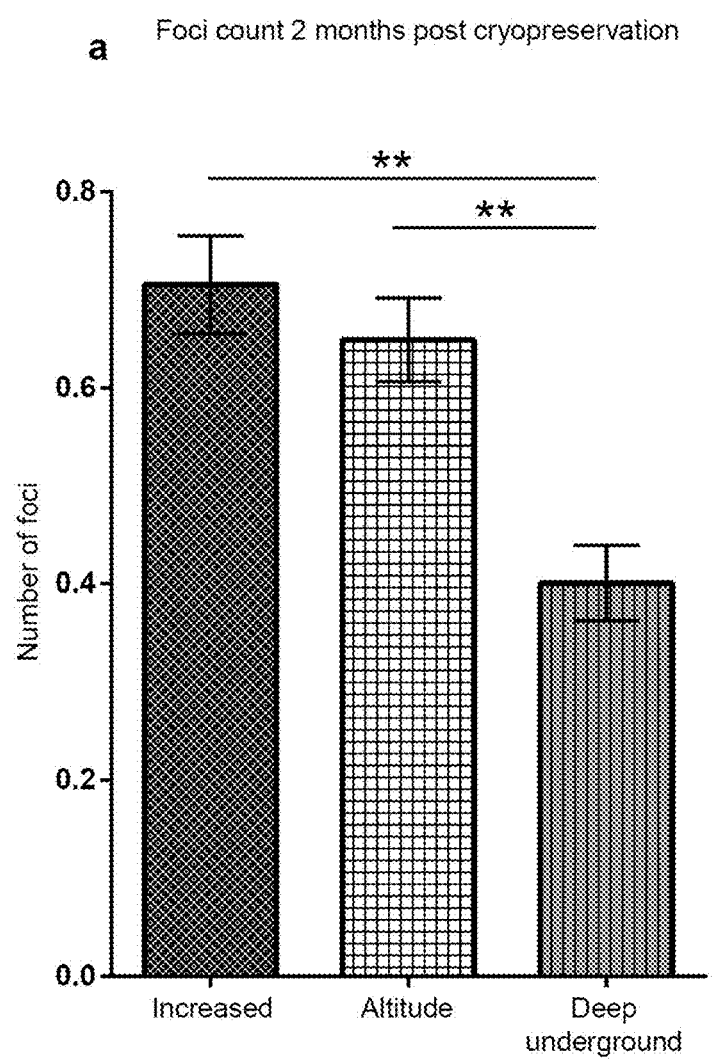
FIG. 3: Neutrons are mainly responsible for double strand breaks (a) Number of foci after 2 months cryopreservation in Increased, Altitude and Deep underground conditions. (b) RT-qPCR on pro and anti-apoptotic genes as well as NHEJ and HR repair genes in Increased, Altitude and Deep underground conditions. (c) Levels of ROS analysed by cytometry in irradiated, exposed to neutrons and protected conditions. (d) Levels of TMRE (mitochondrial membrane potential) analysed by cytometry in Increased, Altitude and Deep underground conditions conditions. (e) Annexin V staining (apoptotic cells) analysed by cytometry in irradiated, exposed to neutrons and protected conditions. p values indicated on figures are <0.05 (*), <0.01 (), <0.001 (*), <0.0001 (****). Figures display average values of all cells tested (n=300 cells counted)±SD or ±SEM for RT-qPCR.

The "Increased" conditions were designed to test the influence of neutron (Altitude condition) versus gamma-rays. The same number of foci as when cells were kept with radioactivity was observed (FIG. 3a) and the gene expression showed the same level of repair DNA NHEJ expression (FIG. 3b). However, in absence of additional radioactivity, no significant elevation of ROS nor TMRE level was detected (FIG. 3c,d). It was also observed a decreased level of apoptotic cells compared with the cryopreservation with enhanced radioactivity (FIG. 3d).

Figure 4:
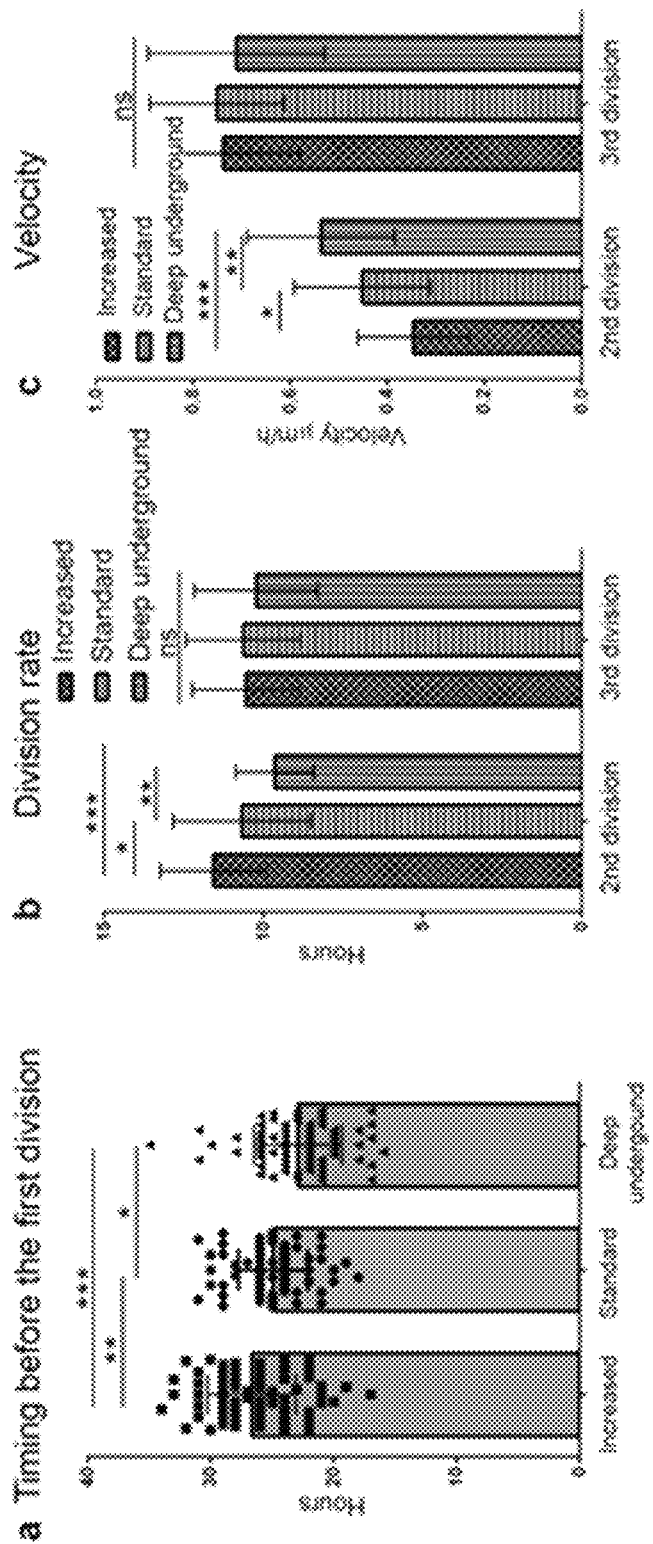
FIG. 4: Muscle stem cells cryopreserved in cosmic rays and irradiation free environment are differentiating faster in vitro and sustain more rounds of serial transplantations (a) Time before the first division post plating in vitro assessed by live videomicroscopy. (b) Division rate assessed by live videomicroscopy in Increased, Standard and Deep underground conditions. (c) Velocity of the cells assessed in vitro by live videomicroscopy in Increased, Standard and Deep underground conditions. (d) Percentage of cells expressing Pax7 (among the total population of plated muscle stem cells in vitro) right after plating, 4 and 14 days post plating in Increased, Standard and Deep underground. (e) Percentage of cells expressing Myogenin (among the total population of plated muscle stem cells in vitro) right after plating, 4, 6, and 14 days post plating in Increased, Standard and Deep underground conditions. (f-g) Immunostainings of Myogenin in Increased and Deep underground conditions 6 days post plating. (h) Percentage of PLAP+ fibres 28 days after grafting cells from Increased and Deep underground cryopreservation condition. The 2 groups were grafted in the right and left tibialis anterior respectively of a Rag2−/−γC−/− immunocompromised and pre-injured. (i) Representative picture of PLAP immunostaining on a transversal section 28 days after grafting irradiated (Increased condition) while cryopreserved muscle stem cells. (j) Representative picture of PLAP immunostaining on a transversal section 28 day after grafting protected (Deep underground condition) while cryopreserved muscle stem cells. (k) Number of GFP+ cells per tibialis anterior after grafting irradiated (Increased condition) while cryopreserved muscle stem cells (upper panel) or protected (Deep underground condition) while cryopreserved muscle stem cells (lower panel). Individual tibialis anterior are display per round of grafting (up to 3). p values indicated on figures are <0.05 (*), <0.01 (), <0.001 (*), <0.0001 (****). Figures display average values of all cells tested (n=300 cells counted)±SD. Scale bar represents 100 μm.
Figure 5:
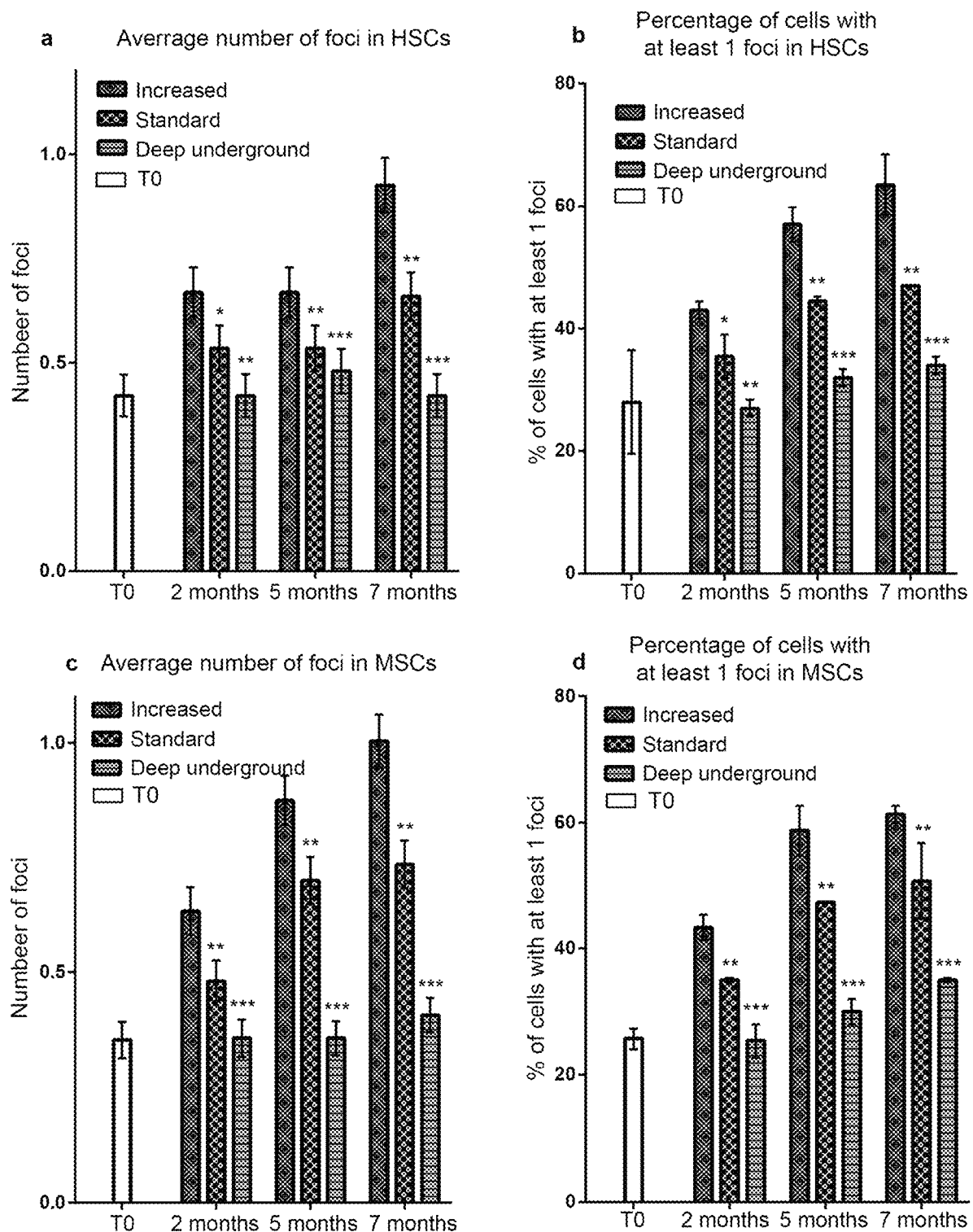
FIG. 5: Hematopoietic stem cells and mesenchymal stem cells are also impacted by long term cryopreservation that created double strand breaks in the DNA.

In order to investigate whether the cryopreservation conditions have a functional impact the previous experiment was repeated. A serial passage and FACS analysis of each cell types and conditions was performed in vitro and in vivo. SCs were isolated, cryopreserved under "Standard", "Increased" and "Deep underground" conditions, and at 7 months post-cryopreservation the cells were thawed and live video microscopy was performed to assess their behaviour. After preservation under «Deep Underground» conditions the cells took shorter time to perform the first division (FIG. 4a). This data was further confirmed by cultivating the SCs with BrdU 24 h. It was showed that fewer cells were in S-phase after cryopreservation in an irradiated environment (FIG. 9a-c). The second division was also faster when cells were cryopreserved under «Deep Underground» conditions. Notably, no differences in cell-cycle time were observed for subsequent divisions in any of the groups studied (FIG. 4b). The same observation was made for velocity of the cells, with faster SCs when kept under «Deep Underground» conditions but only for the first and second divisions (FIG. 4c). When investigating in vitro the differentiation potential of the SCs kept in all different conditions we observed by immunostaining a faster decrease of the nuclear protein Pax7 (marker of quiescent SCs[15], (FIG. 4d)) and faster expression of Myogenin (marker of differentiation of SCs[16], (FIG. 4e-g)).

The differentiation and self-renewal potential of these subpopulations was then examined in vivo in transplantation and regeneration assays. Triple transgenic mice were used for quantifications: Tg:CAG-hPLAP carrying the human placental alkaline phosphatase gene that is expressed ubiquitously[19], Tg:MLC3F-nlacZ-2E that marks differentiated myonuclei[20] and Tg:Pax7-nGFP to isolate the SCs by cytometry.[1,2] SCs were isolated by FACS, and 10,000 GFP+ SCs were transplanted in cryodamaged tibialis anterior (TA) muscle of immunocompromised $Rag2^{-/-}:gC^{-/-}$ mice. SCs from irradiated conditions were injected in the left TA, SCs from cosmic ray free environment in the right TA. Twenty-eight days later, analysis by immunofluorescence showed a large area of newly generated PLAP+ myofibers and no differences could be detected (FIG. 4*h-j*). To assess the long-term regenerative capacity of the SCs cryopreserved in different conditions in vivo, an initial transplantation was performed with 10,000 SCs isolated by FACS (FIG. 4*k*). Four weeks later, several thousand GFP+ SCs were collected, pooled (respecting the condition of storage), and used for transplant into the pre-injured TA muscle of secondary recipient mice. Subsequent serial transplantations were performed in a similar manner (four rounds maximum; FIG. 4*k*). A drop in cell numbers was often observed between transplanted and harvested cells, likely due to cell death immediately after transplantation[19]. After the first round of grafting an average of 64% more cells were collected under «Deep Underground» conditions with respect to "Standard" conditions. The second round led to a 25% increase in SCs recovery and the difference was lost after the third round. However, it is noteworthy that the quantity of cells recovered was always higher in the condition of storage cosmic ray free. HSCs isolated from Tg:Actin-GFP and injected intravenously into 95cGy irradiated $Rag2^{-/-}:gC^{-/-}$ mice showed more efficiency to make white blood cells (FIG. 9*d*). However, after 8 weeks the same quantity of GFP+ cells was found in the blood and the bone marrow in both condition of storage (FIG. 9*e*). After cryopreservation in an irradiated environment, the SCs take longer time to exit quiescence but differentiate faster. They sustain fewer rounds of serial transplantations. For HSCs the participation of the cells to the blood tissue is also faster. However, upon completion of the regeneration, no differences were detected in those paradigms.

4. Conclusions

In sum, it was shown that the method of the invention prevents DSB, which is otherwise inevitable upon long-term storage. It was also shown that neutrons exposure is the main source of energy responsible for DSB, and that gamma-rays and neutrons induce higher ROS concentrations in cells. Low repair of DSB in vitro was observed, which highlights the importance of completely protecting stem cells upon cryopreservation: otherwise, cells would keep the DSB over time, and even could end up damaging the surrounding cells by "bystander" effect. In addition, quiescent stem cells rely on the NHEJ error prone mechanism, which renders them vulnerable to mutagenesis following DNA damage. Thus, to preserve the genetic stability of stem cells for extended periods of time (for instance for up to 80-90 years) and be able to use them afterwards, it seems necessary to keep them protected from cosmic ray and natural radioactivity aggressions (which are cumulative), using the method of the invention.

The method of the invention further enables to overcome the burden of non- or less-functional stem cells, when patients will need to recover the material after up to 100-year cryopreservation.

REFERENCES

1. Sambasivan, R. et al. Distinct Regulatory Cascades Govern Extraocular and Pharyngeal Arch Muscle Progenitor Cell Fates. *Dev. Cell* 16, 810-821 (2009).
2. Rocheteau, P., Gayraud-Morel, B., Siegl-Cachedenier, I., Blasco, M. a. & Tajbakhsh, S. A subpopulation of adult skeletal muscle stem cells retains all template DNA strands after cell division. *Cell* 148, 112-125 (2012).
3. Hoeijmakers, J. H. Genome maintenance mechanisms for preventing cancer. *Nature* 411, 366-74 (2001).
4. Schofield, R. The relationship between the spleen colony-forming cell and the haemopoietic stem cell. *Blood Cells* 4, 7-25 (1978).
5. Rothkamm, K. & Löbrich, M. Evidence for a lack of DNA double-strand break repair in human cells exposed to very low x-ray doses. *Proc. Natl. Acad. Sci. U.S.A* 100, 5057-62 (2003).
6. Mohrin, M. et al. Hematopoietic stem cell quiescence promotes error-prone DNA repair and mutagenesis. *Cell Stem Cell* 7, 174-185 (2010).
7. Vahidi Ferdousi, L. et al. More efficient repair of DNA double-strand breaks in skeletal muscle stem cells compared to their committed progeny. *Stem Cell Res.* 13, 492-507 (2014).
8. Sotiropoulou, P. A. et al. Bcl-2 and accelerated DNA repair mediates resistance of hair follicle bulge stem cells to DNA-damage-induced cell death. *Nat. Cell Biol.* 12, 572-582 (2010).
11. Weinstock, D. M., Richardson, C. A., Elliott, B. & Jasin, M. Modeling oncogenic translocations: Distinct roles for double-strand break repair pathways in translocation formation in mammalian cells. *DNA Repair (Amst).* 5, 1065-1074 (2006).
12. Wyman, C. & Kanaar, R. DNA double-strand break repair: all's well that ends well. *Annu. Rev. Genet.* 40, 363-83 (2006).
13. Cory, S., Huang, D. C. S. & Adams, J. M. The Bcl-2 family: roles in cell survival and oncogenesis. *Oncogene* 22, 8590-607 (2003).
14. Jang, Y. Y. & Sharkis, S. J. A low level of reactive oxygen species selects for primitive hematopoietic stem cells that may reside in the low-oxygenic niche. *Blood* 110, 3056-3063 (2007).
15. Owusu-Ansah, E. & BanerJee, U. Reactive oxygen species prime *Drosophila haematopoietic* progenitors for differentiation. *Nature* 461, 537-41 (2009).
16. Dansen, T. B. et al. Redox-sensitive cysteines bridge p300/CBP-mediated acetylation and FoxO4 activity. *Nat. Chem. Biol.* 5, 664-72 (2009).
17. Seale, P. et al. Pax7 is required for the specification of myogenic satellite cells. *Cell* 102, 777-786 (2000).
18. Zammit, P. S., Partridge, T. A. & Yablonka-Reuveni, Z. The skeletal muscle satellite cell: the stem cell that came in from the cold. *J. Histochem. Cytochem. Off. J. Histochem. Soc.* 54, 1177-1191 (2006).
19. DePrimo, S. E., Stambrook, P. J. & Stringer, J. R. Human placental alkaline phosphatase as a histochemical marker of gene expression in transgenic mice. *Transgenic Res.* 5, 459-66 (1996).
20. Kelly, R., Alonso, S., Tajbakhsh, S., Cossu, G. & Buckingham, M. Myosin light chain 3F regulatory sequences confer regionalized cardiac and skeletal muscle expression in transgenic mice. *J. Cell Biol.* 129, 383-396 (1995).
21. Beauchamp, J. R., Morgan, J. E., Pagel, C. N. & Partridge, T. A. Dynamics of myoblast transplantation reveal a discrete minority of precursors with stem cell-like properties as the myogenic source. *J. Cell Biol.* 144, 1113-1121 (1999).
22. Ziegler, J. F. Terrestrial cosmic rays *IBM J. Res. Develop.* 40 No. 1 Jan. 1996
23. Mei, D.-M., Hime, A. Muon-induced background study for underground laboratories. *Phys. Rev.* D 73, 053004 (2006)
24. Gordon, M. S. et al. Measurement of the Flux and Energy Spectrum of Cosmic-Ray Induced Neutrons on the Ground *IEEE TRANSACTIONS ON NUCLEAR SCIENCE*, VOL. 51, NO. 6, DECEMBER 2004
25. Advances in Space Research, Volume 53, Issue 2, 15 Jan. 2014, Pages 348-352
26. International Journal of Physics and Research (IJPR) ISSN 2250-0030 Vol. 3, Issue 2, June 2013, 7-16
27. Jonathan PL Cox. Long-term data storage in DNA. TRENDS in Biotechnology 19, 7 (2001), 247-250
28. Nozomu Yachie et al. Alignment-based approach for durable data storage into living organisms. Biotechnology progress 23, 2 (2007), 501-505

The invention claimed is:

1. A preservation container comprising:
a biological container for containing biological material;
a first shield configured for absorbing gamma-rays, wherein the first shield has a gamma-ray attenuation factor equivalent to 10 cm to 15 cm of lead; and
a second shield configured for absorbing ambient neutrons, said second shield surrounding the biological container, wherein the second shield has a neutron attenuation factor equivalent to 30 to 100 cm of water;
the preservation container being of low-radioactivity background materials, wherein the materials have a radioactivity of 10 Bq/kg or less, and
wherein a radon-free fluid, being a fluid having radioactivity of less than 0.1 Bq/m$^3$ due to radon, stands and/or circulates around and/or within the biological container, wherein the radon-free fluid comprises radon-free air, radon-free nitrogen, or radon-free argon.

2. The preservation container of claim 1, wherein
the first shield is located between the biological container and the second shield, or
the second shield surrounds the biological container and is located within the first shield.

3. The preservation container of claim 1, wherein it further comprises a cryogenic container, said cryogenic container containing a cold source and defining a chamber for containing the biological container.

4. The preservation container of claim 3, wherein:
the first shield surrounds the biological container and is located within the cryogenic container, or
the first shield is located between the cryogenic container and the second shield, or
the second shield is located within the first shield.

5. The preservation container of claim 4, wherein the first shield surrounds the biological container and is located within the cryogenic container, and the second shield surrounds the cryogenic container.

6. The preservation container of claim 3, wherein the cold source is a heat engine, or a cryogenic fluid comprising liquid nitrogen or argon.

7. A method for preserving a biological material, comprising:
a) providing a biological material in a confinement container,
b) providing the preservation container of claim 1,
c) placing the confinement container containing the biological material into the biological container of said preservation container,
d) storing said preservation container containing the biological material in a room located under a material attenuating cosmic rays and induced particles, said material having a thickness equivalent to 1 m to 7000 m of water, for attenuating cosmic rays.

8. The method of claim 7, wherein the material attenuating cosmic rays is earth, rock, water and/or concrete.

9. The method of claim 8, wherein the radon-free fluid is a fluid having radioactivity of less than 0.1 Bq/m$^3$ due to radon.

10. The method of claim 7, wherein
the radon-free fluid is a fluid having radioactivity of less than 0.1 Bq/m$^3$ due to radon, and/or
the room contains an atmosphere of less than 1 Bq/m$^3$.

11. The method of claim 10, wherein
the atmosphere of less than 0.1 Bq/m$^3$ is a radon-free atmosphere.

12. The method of claim 7, wherein the biological material is a data storage material.

13. The method of claim 12, wherein the data storage material comprises DNA, RNA, a peptide, a protein, a virus, or a bacterium or any combination thereof.

14. The method of claim 7, wherein the preservation container further comprises a cryogenic container comprising a cold source and a chamber containing the biological container, said biological container being cooled by the cold source,
and wherein step c) comprises cooling the biological material by placing the confinement container in the biological container.

15. The method of claim 14, wherein the biological container is frozen by placing it within or in freezing proximity to the cold source.

16. The method of claim 14, wherein the biological material is:
a peptide, a protein, DNA, or RNA;
a pluripotent stem cell, an induced pluripotent stem cell, or a gamete;
a seed, a spore, or a pollen;
a larvae, an insect, a bacterium, a virus; or
a tissue, an organ, body parts or a whole animal body.

17. The preservation container of claim 1 wherein the second shield comprises polyethylene containing at least 14 wt % of hydrogen atom, hydrogen containing polyolefins, paraffin, or wood, or any combination thereof.

18. The preservation container of claim 17, further comprising a cryogenic container, said cryogenic container containing a cold source and defining a chamber for containing the biological container, wherein the cold source is a heat engine, or a cryogenic fluid comprising liquid nitrogen or argon.

19. System for preserving a biological material comprising the preservation container containing the biological material of claim 1 and further comprising a room located under a material attenuating cosmic rays and induced particles, said material having a thickness equivalent to 1 m to 7000 m of water, for attenuating cosmic rays, the preservation container containing the biological material is located within the room.

* * * * *